US012588056B2

(12) United States Patent
    Leng et al.

(10) Patent No.: US 12,588,056 B2
(45) Date of Patent: Mar. 24, 2026

(54) TIMING ADVANCE MANAGEMENT

(71) Applicant: Samsung Electronics Co., Ltd.,
    Suwon-si (KR)

(72) Inventors: Shiyang Leng, Allen, TX (US);
    Kyeongin Jeong, Allen, TX (US)

(73) Assignee: Samsung Electronics Co., Ltd.,
    Suwon-si (KR)

( * ) Notice: Subject to any disclaimer, the term of this
    patent is extended or adjusted under 35
    U.S.C. 154(b) by 247 days.

(21) Appl. No.: 18/305,257

(22) Filed: Apr. 21, 2023

(65) Prior Publication Data

US 2023/0362986 A1     Nov. 9, 2023

Related U.S. Application Data

(60) Provisional application No. 63/395,616, filed on Aug.
    5, 2022, provisional application No. 63/392,776, filed
    on Jul. 27, 2022, provisional application No.
    63/339,277, filed on May 6, 2022.

(51) Int. Cl.
    *H04W 74/04*        (2009.01)
    *H04W 74/00*        (2009.01)
    *H04W 74/08*        (2024.01)
    *H04W 74/0833*      (2024.01)
    *H04W 74/0836*      (2024.01)
    *H04W 74/0838*      (2024.01)

(52) U.S. Cl.
    CPC ......... *H04W 74/04* (2013.01); *H04W 74/006*
    (2013.01); *H04W 74/0838* (2024.01); *H04W*

*74/0891* (2013.01); *H04W 74/0833* (2013.01);
                      *H04W 74/0836* (2024.01)

(58) Field of Classification Search
    CPC . H04W 74/002; H04W 74/006; H04W 74/04;
        H04W 74/0833; H04W 74/0836; H04W
                74/0838; H04W 74/0891
    See application file for complete search history.

(56) References Cited

U.S. PATENT DOCUMENTS

2020/0100201 A1     3/2020  Farmanbar et al.
    2021/0235504 A1     7/2021  Dinan
    2023/0199571 A1 *   6/2023  Babaei .............. H04W 36/0072
                                                          370/331
    2023/0239823 A1 *   7/2023  Liu ................... H04W 56/0045
                                                          370/350

(Continued)

OTHER PUBLICATIONS

International Search Report and Written Opinion issued Aug. 1,
2023 regarding International Application No. PCT/KR2023/
006119, 14 pages.

(Continued)

*Primary Examiner* — Awet Haile

(57)          ABSTRACT

Methods and apparatuses for a timing advance management
for multi-TRP and beam management in a wireless commu-
nication system. A method of a UE comprises: receiving,
from a first BS, a second TAG ID associated with a second
BS and a PDCCH order; initiating a CFRA procedure in
response to receiving the PDCCH order; transmitting, to a
second BS, a RA preamble; receiving, for the second BS, a
TAC included in a RAR or in a MAC CE; and applying the
TAC and start a second time alignment timer corresponding
to the second TAG ID associated with the second BS.

20 Claims, 19 Drawing Sheets

(56) References Cited

U.S. PATENT DOCUMENTS

2023/0284287 A1* 9/2023 Kung .................... H04L 5/0023
370/329
2024/0023045 A1* 1/2024 Da Silva ............. H04W 36/249
2024/0397463 A1* 11/2024 Yue ................... H04W 56/0045
2025/0024512 A1* 1/2025 Guo ................. H04W 72/0453

OTHER PUBLICATIONS

ZTE, "TA enhancement for multi-DCI", 3GPP TSG RAN WG1 Meeting #109-e, R1-2203264, Apr. 2022, 9 pages.
Vivo, "Views on two TAs for multi-DCI-based multi-TRP operation", 3GPP TSG RAN WG1 Meeting #109-e, R1-2203542, Apr. 2022, 6 pages.
Xiaomi, "Discussion on two TAs for multi-TRP operation", 3GPP TSG RAN WG1 Meeting #109-e, R1-2203794, Apr. 2022, 6 pages.
"5G; NR; NR and NG-RAN Overall description; Stage-2 (3GPP TS 38.300 version 17.1.0 Release 17)", ETSI TS 138 300 V17.1.0, Aug. 2022, 211 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.
"5G; NR; Medium Access Control (MAC) protocol specification (3GPP TS 38.321 version 17.1.0 Release 17)", ETSI TS 138 321 V17.1.0 , Aug. 2022, 244 pages.
"5G; NR; Requirements for support of radio resource management (3GPP TS 38.133 version 17.6.0 Release 17)", ETSI TS 138 133 V17.6.0, Sep. 2022, 3348 pages.
"5G; NR; User Equipment (UE) radio access capabilities (3GPP TS 38.306 version 17.1.0 Release 17)", ETSI TS 138 306 V17.1.0, Aug. 2022, 226 pages.
"3rd Generation Partnership Project; Technical Specification Group Radio Access Network; NR; Physical layer procedures for control (Release 17)", 3GPP TS 38.213 V17.2.0, Jun. 2022, 256 pages.
MediaTek Inc., "Revised WID on Further NR mobility enhancements", 3GPP TSG RAN Meeting #96, RP-221799, Jun. 2022, 5 pages.
Extended European Search Report issued May 28, 2025 regarding Application No. 23799703.6 , 9 pages.
Apple Inc., "On Two Timing Advances for Multi-DCI Uplink Transmissions", 3GPP TSG RAN WG1 #109-e, R1-2204230, May 2022, 4 pages.
Samsung, "RACH Aspects for CA and DC", 3GPP TSG RAN WG1 Meeting #89, R1-1708043, May 2017, 3 pages.

\* cited by examiner

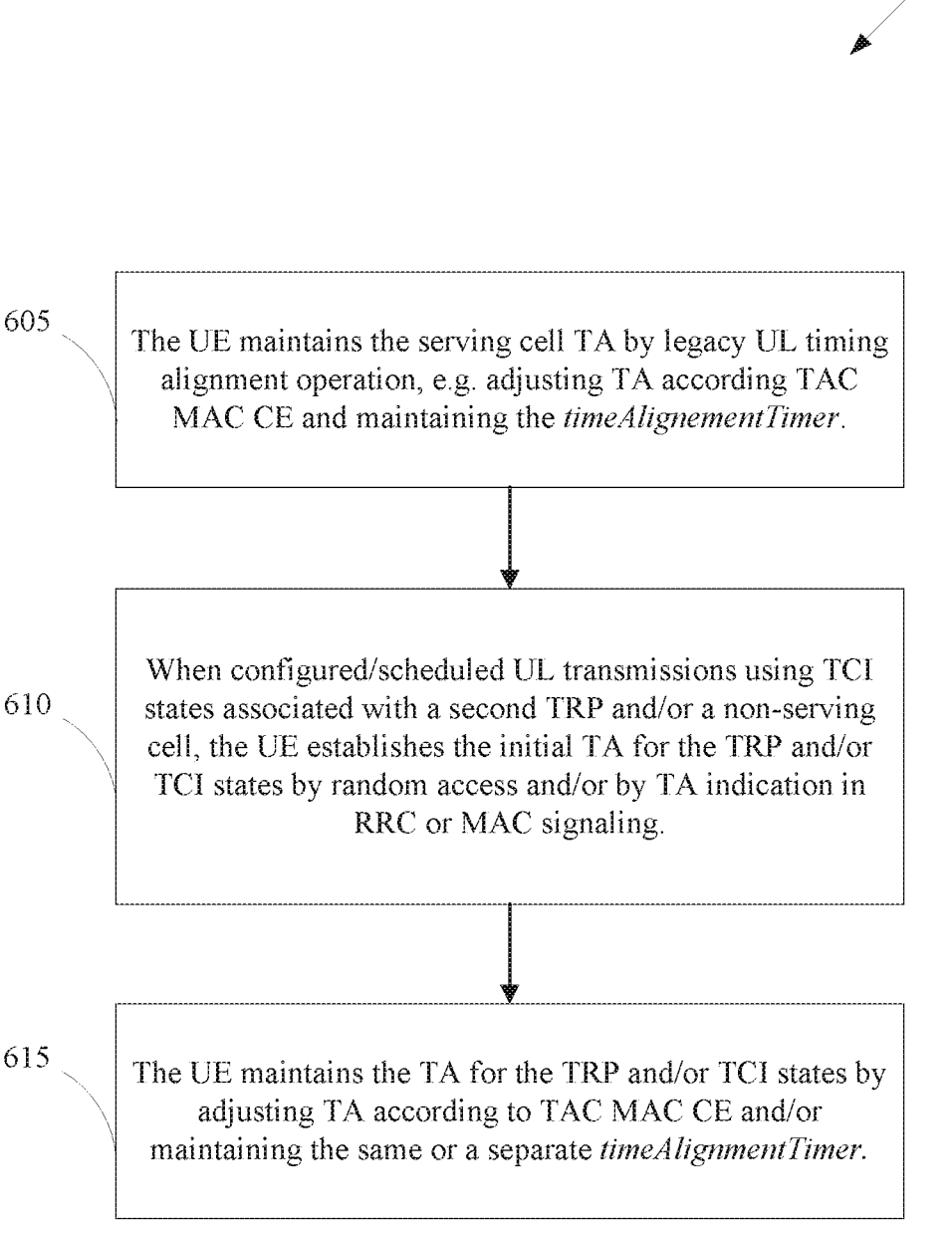

600

605 — The UE maintains the serving cell TA by legacy UL timing alignment operation, e.g. adjusting TA according TAC MAC CE and maintaining the *timeAlignementTimer*.

610 — When configured/scheduled UL transmissions using TCI states associated with a second TRP and/or a non-serving cell, the UE establishes the initial TA for the TRP and/or TCI states by random access and/or by TA indication in RRC or MAC signaling.

615 — The UE maintains the TA for the TRP and/or TCI states by adjusting TA according to TAC MAC CE and/or maintaining the same or a separate *timeAlignmentTimer*.

FIG. 6

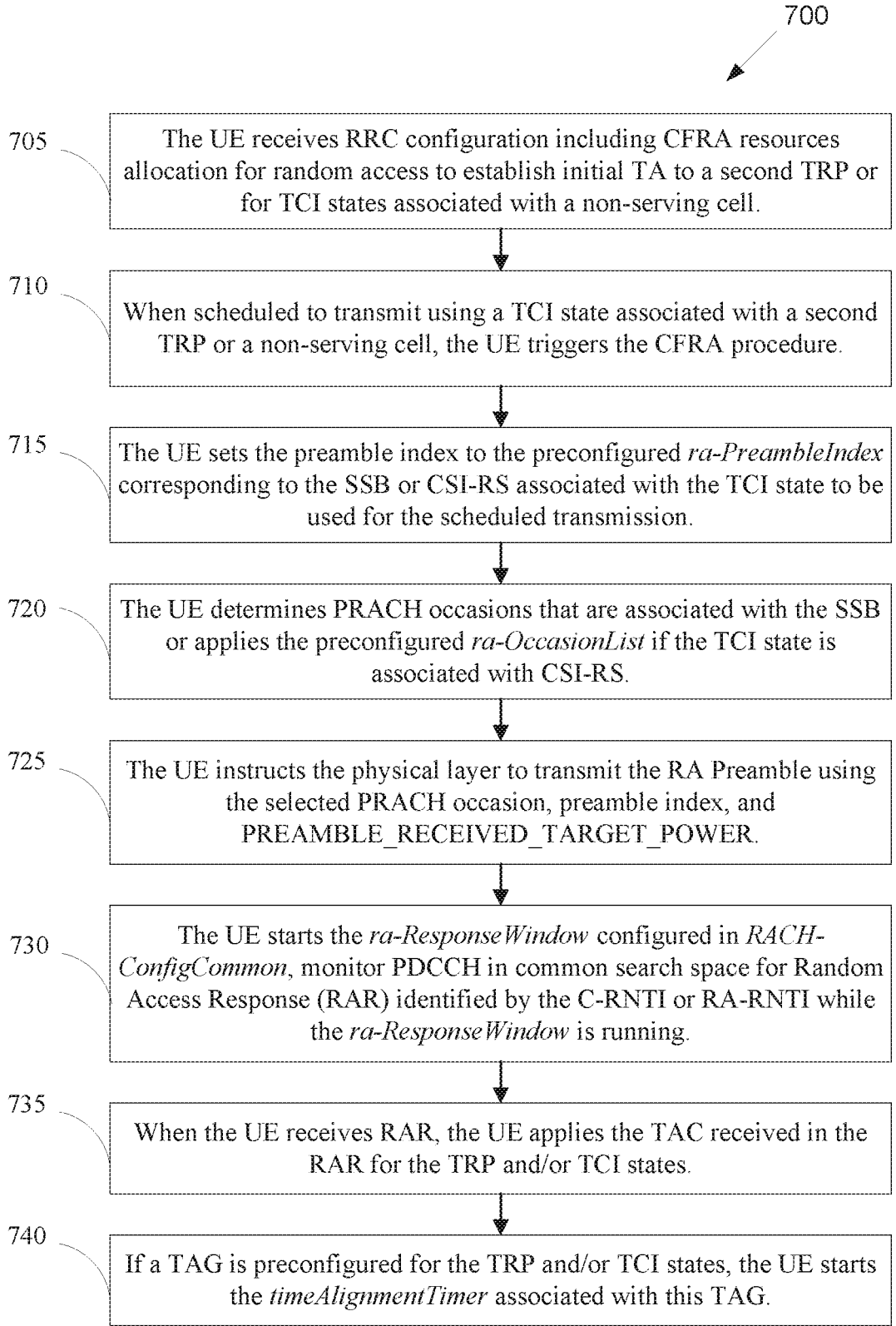

700

705 — The UE receives RRC configuration including CFRA resources allocation for random access to establish initial TA to a second TRP or for TCI states associated with a non-serving cell.

710 — When scheduled to transmit using a TCI state associated with a second TRP or a non-serving cell, the UE triggers the CFRA procedure.

715 — The UE sets the preamble index to the preconfigured *ra-PreambleIndex* corresponding to the SSB or CSI-RS associated with the TCI state to be used for the scheduled transmission.

720 — The UE determines PRACH occasions that are associated with the SSB or applies the preconfigured *ra-OccasionList* if the TCI state is associated with CSI-RS.

725 — The UE instructs the physical layer to transmit the RA Preamble using the selected PRACH occasion, preamble index, and PREAMBLE_RECEIVED_TARGET_POWER.

730 — The UE starts the *ra-ResponseWindow* configured in *RACH-ConfigCommon*, monitor PDCCH in common search space for Random Access Response (RAR) identified by the C-RNTI or RA-RNTI while the *ra-ResponseWindow* is running.

735 — When the UE receives RAR, the UE applies the TAC received in the RAR for the TRP and/or TCI states.

740 — If a TAG is preconfigured for the TRP and/or TCI states, the UE starts the *timeAlignmentTimer* associated with this TAG.

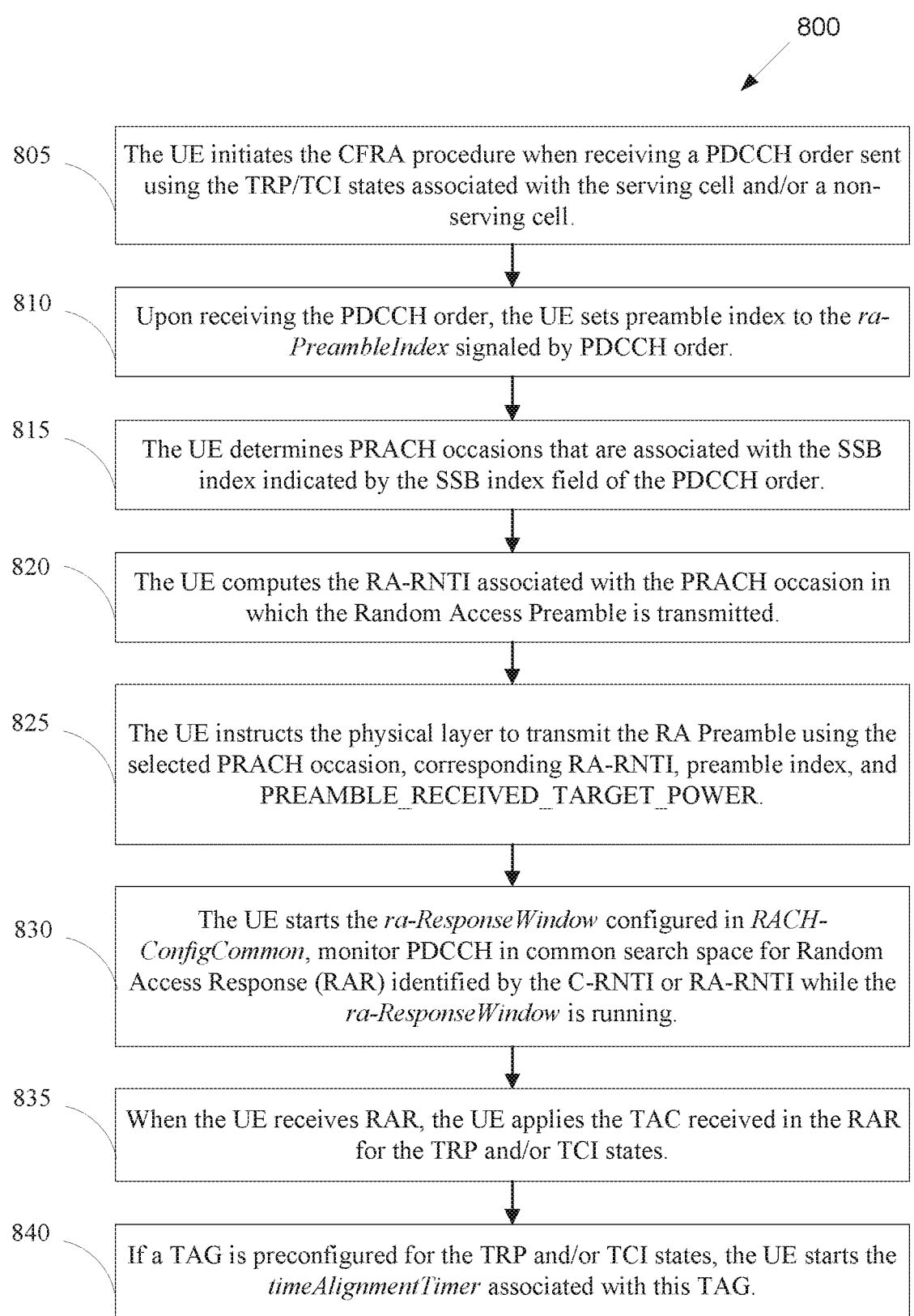

805 — The UE initiates the CFRA procedure when receiving a PDCCH order sent using the TRP/TCI states associated with the serving cell and/or a non-serving cell.

810 — Upon receiving the PDCCH order, the UE sets preamble index to the *ra-PreambleIndex* signaled by PDCCH order.

815 — The UE determines PRACH occasions that are associated with the SSB index indicated by the SSB index field of the PDCCH order.

820 — The UE computes the RA-RNTI associated with the PRACH occasion in which the Random Access Preamble is transmitted.

825 — The UE instructs the physical layer to transmit the RA Preamble using the selected PRACH occasion, corresponding RA-RNTI, preamble index, and PREAMBLE_RECEIVED_TARGET_POWER.

830 — The UE starts the *ra-ResponseWindow* configured in *RACH-ConfigCommon*, monitor PDCCH in common search space for Random Access Response (RAR) identified by the C-RNTI or RA-RNTI while the *ra-ResponseWindow* is running.

835 — When the UE receives RAR, the UE applies the TAC received in the RAR for the TRP and/or TCI states.

840 — If a TAG is preconfigured for the TRP and/or TCI states, the UE starts the *timeAlignmentTimer* associated with this TAG.

| CORE SET pool ID | TCI State ID | Oct 1 |
| --- | --- | --- |
| | Timing Advance Command | Oct 2 |

1000

| TAG ID | T1 | T2 | R | Oct 1 |
| --- | --- | --- | --- | --- |
| Timing Advance Command | | | | Oct 2 |
| Timing Advance Offset | | | | Oct 3 |

1100

| TAG ID | Timing Advance Command | Oct 1 |
| --- | --- | --- |
| CORE SET pool ID | TCI State ID | Oct 2 |

1200

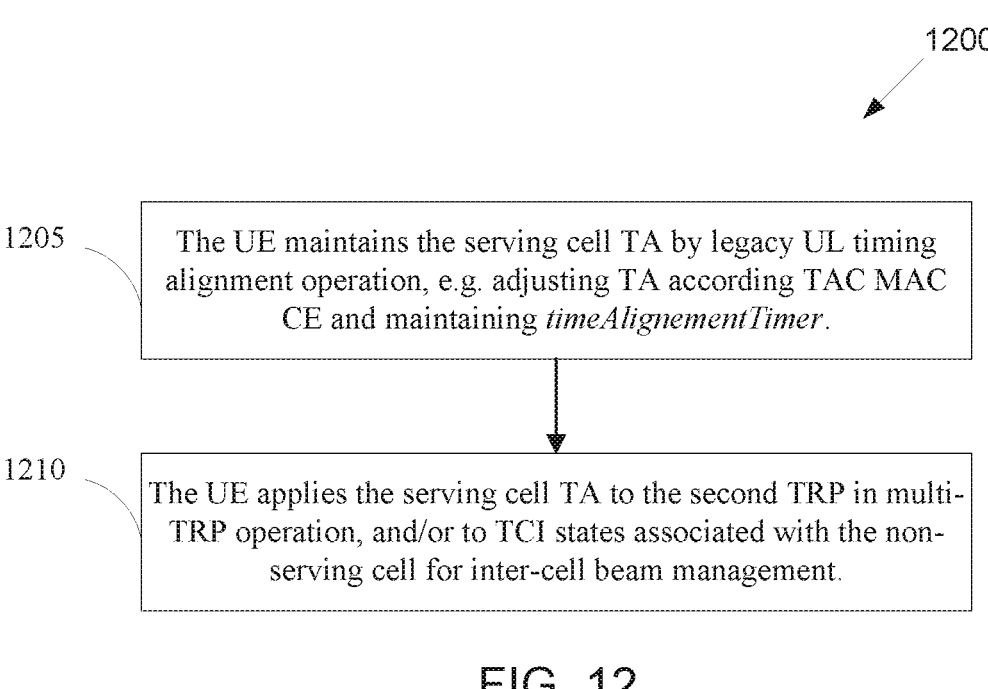

1205 — The UE maintains the serving cell TA by legacy UL timing alignment operation, e.g. adjusting TA according TAC MAC CE and maintaining *timeAlignementTimer*.

1210 — The UE applies the serving cell TA to the second TRP in multi-TRP operation, and/or to TCI states associated with the non-serving cell for inter-cell beam management.

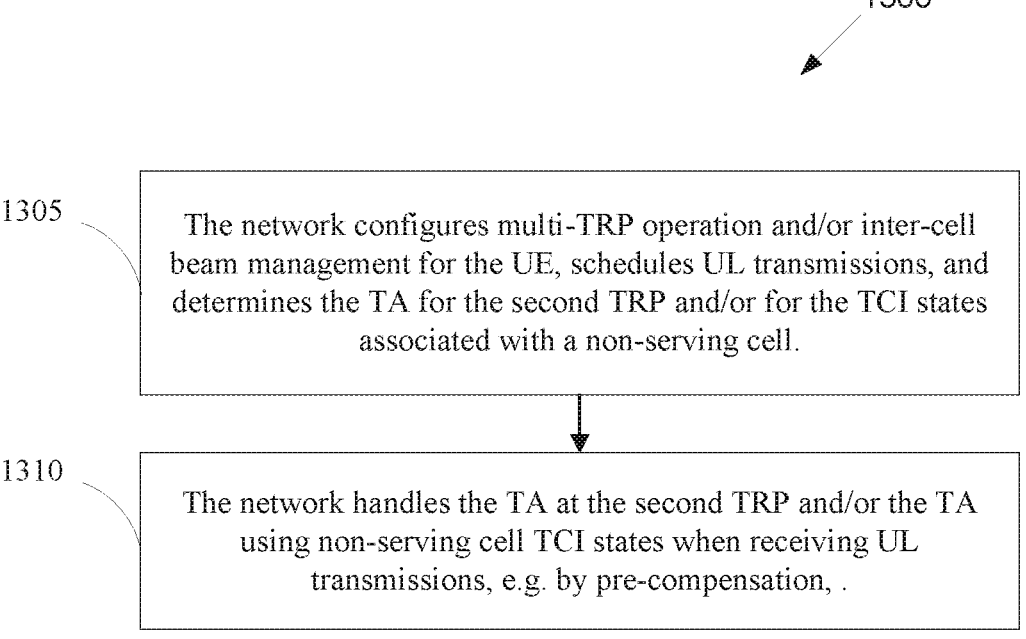

1305 — The network configures multi-TRP operation and/or inter-cell beam management for the UE, schedules UL transmissions, and determines the TA for the second TRP and/or for the TCI states associated with a non-serving cell.

1310 — The network handles the TA at the second TRP and/or the TA using non-serving cell TCI states when receiving UL transmissions, e.g. by pre-compensation, .

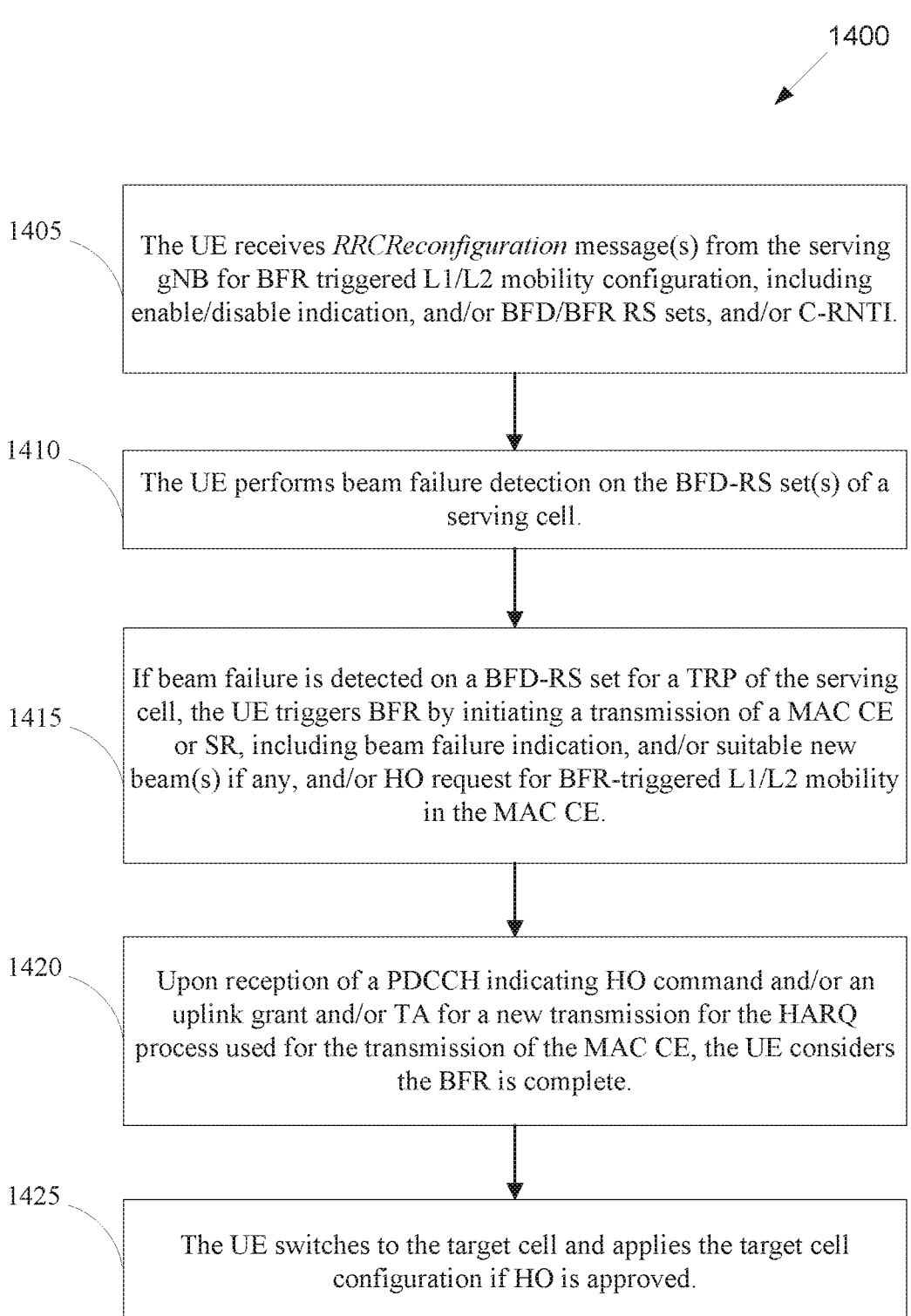

1405 — The UE receives *RRCReconfiguration* message(s) from the serving gNB for BFR triggered L1/L2 mobility configuration, including enable/disable indication, and/or BFD/BFR RS sets, and/or C-RNTI.

1410 — The UE performs beam failure detection on the BFD-RS set(s) of a serving cell.

1415 — If beam failure is detected on a BFD-RS set for a TRP of the serving cell, the UE triggers BFR by initiating a transmission of a MAC CE or SR, including beam failure indication, and/or suitable new beam(s) if any, and/or HO request for BFR-triggered L1/L2 mobility in the MAC CE.

1420 — Upon reception of a PDCCH indicating HO command and/or an uplink grant and/or TA for a new transmission for the HARQ process used for the transmission of the MAC CE, the UE considers the BFR is complete.

1425 — The UE switches to the target cell and applies the target cell configuration if HO is approved.

FIG. 14

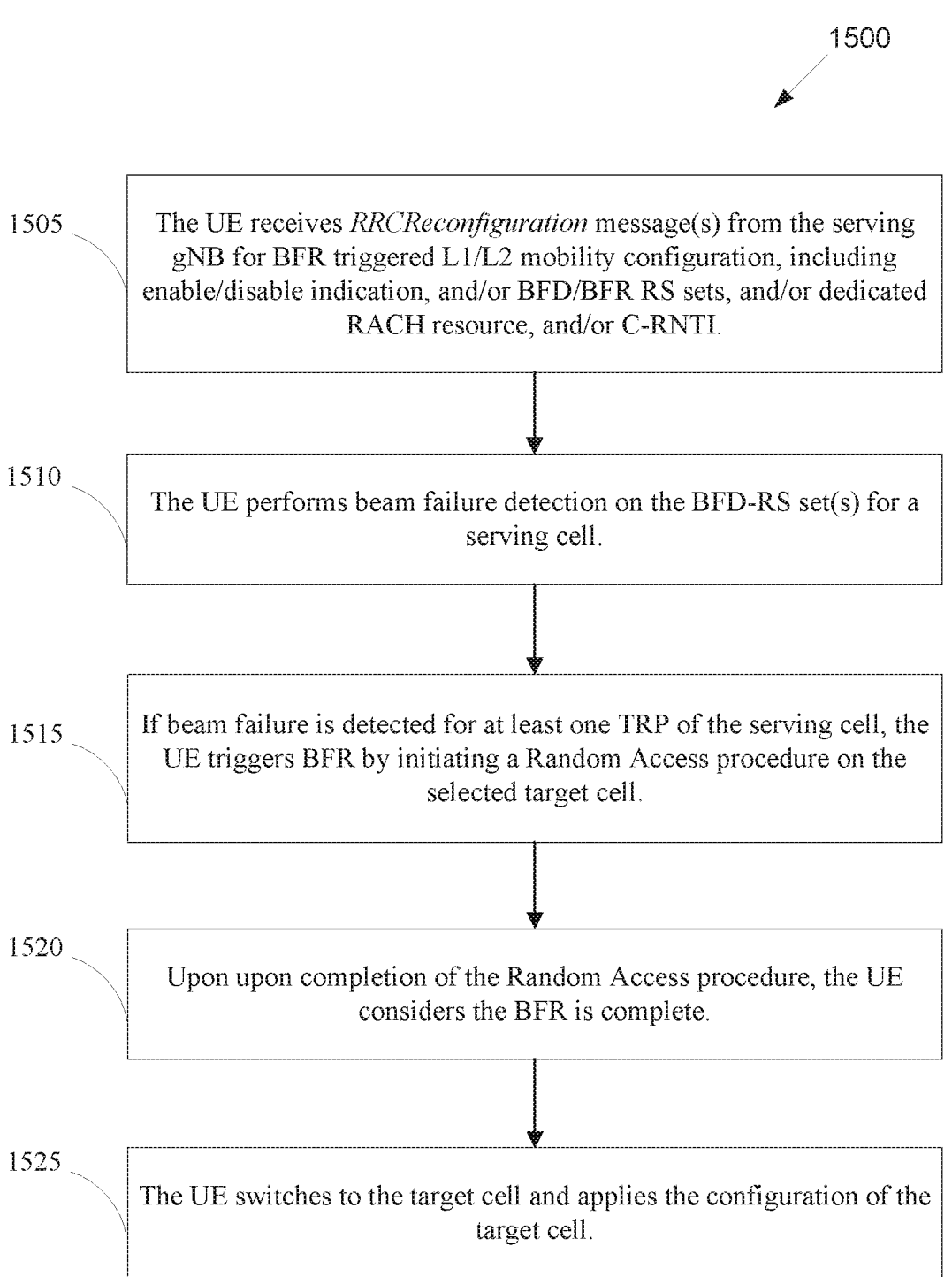

1500

1505 — The UE receives *RRCReconfiguration* message(s) from the serving gNB for BFR triggered L1/L2 mobility configuration, including enable/disable indication, and/or BFD/BFR RS sets, and/or dedicated RACH resource, and/or C-RNTI.

1510 — The UE performs beam failure detection on the BFD-RS set(s) for a serving cell.

1515 — If beam failure is detected for at least one TRP of the serving cell, the UE triggers BFR by initiating a Random Access procedure on the selected target cell.

1520 — Upon upon completion of the Random Access procedure, the UE considers the BFR is complete.

1525 — The UE switches to the target cell and applies the configuration of the target cell.

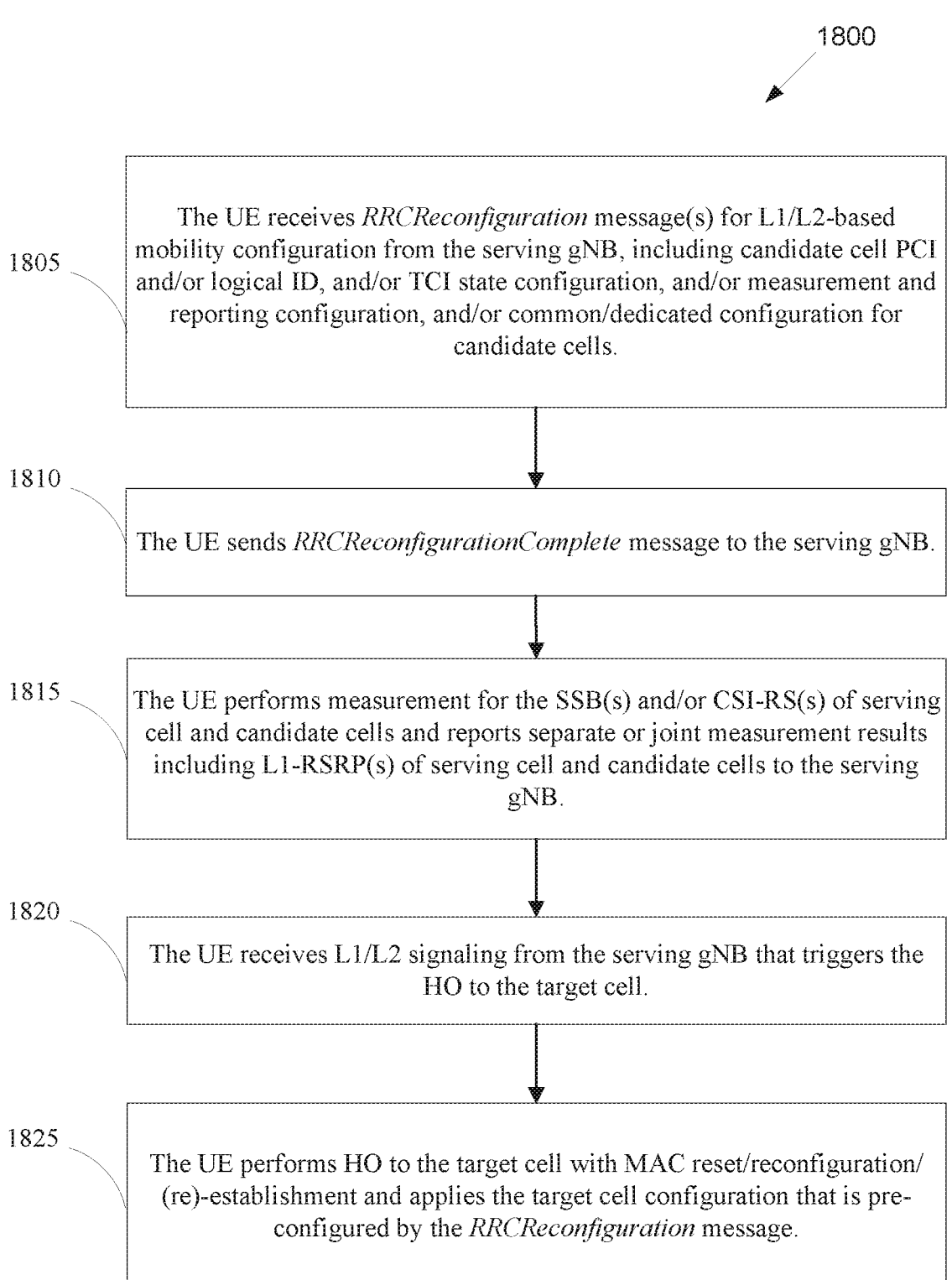

1800

1805 — The UE receives *RRCReconfiguration* message(s) for L1/L2-based mobility configuration from the serving gNB, including candidate cell PCI and/or logical ID, and/or TCI state configuration, and/or measurement and reporting configuration, and/or common/dedicated configuration for candidate cells.

1810 — The UE sends *RRCReconfigurationComplete* message to the serving gNB.

1815 — The UE performs measurement for the SSB(s) and/or CSI-RS(s) of serving cell and candidate cells and reports separate or joint measurement results including L1-RSRP(s) of serving cell and candidate cells to the serving gNB.

1820 — The UE receives L1/L2 signaling from the serving gNB that triggers the HO to the target cell.

1825 — The UE performs HO to the target cell with MAC reset/reconfiguration/ (re)-establishment and applies the target cell configuration that is pre-configured by the *RRCReconfiguration* message.

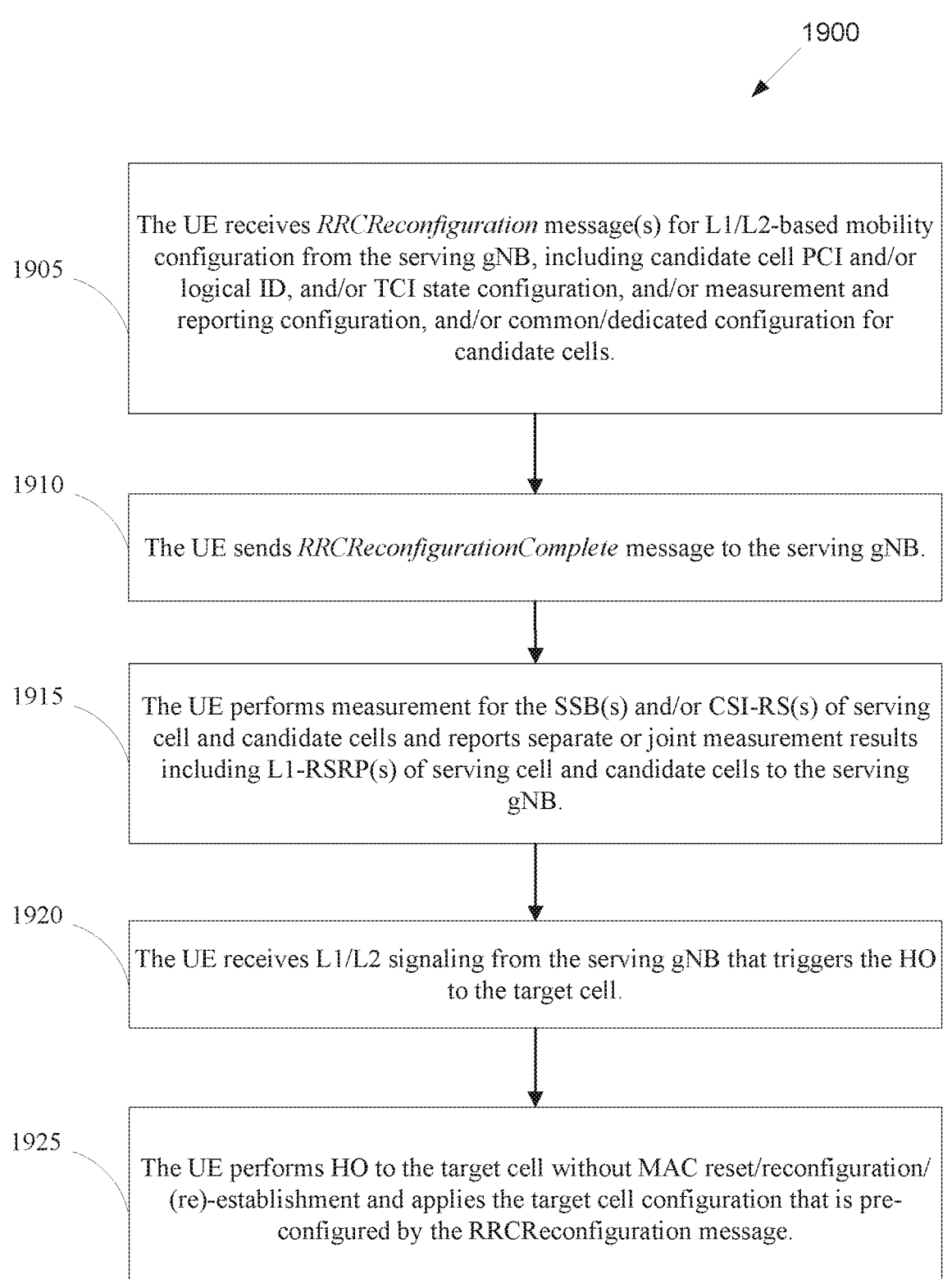

1905

The UE receives *RRCReconfiguration* message(s) for L1/L2-based mobility configuration from the serving gNB, including candidate cell PCI and/or logical ID, and/or TCI state configuration, and/or measurement and reporting configuration, and/or common/dedicated configuration for candidate cells.

1910

The UE sends *RRCReconfigurationComplete* message to the serving gNB.

1915

The UE performs measurement for the SSB(s) and/or CSI-RS(s) of serving cell and candidate cells and reports separate or joint measurement results including L1-RSRP(s) of serving cell and candidate cells to the serving gNB.

1920

The UE receives L1/L2 signaling from the serving gNB that triggers the HO to the target cell.

1925

The UE performs HO to the target cell without MAC reset/reconfiguration/(re)-establishment and applies the target cell configuration that is pre-configured by the RRCReconfiguration message.

FIG. 19

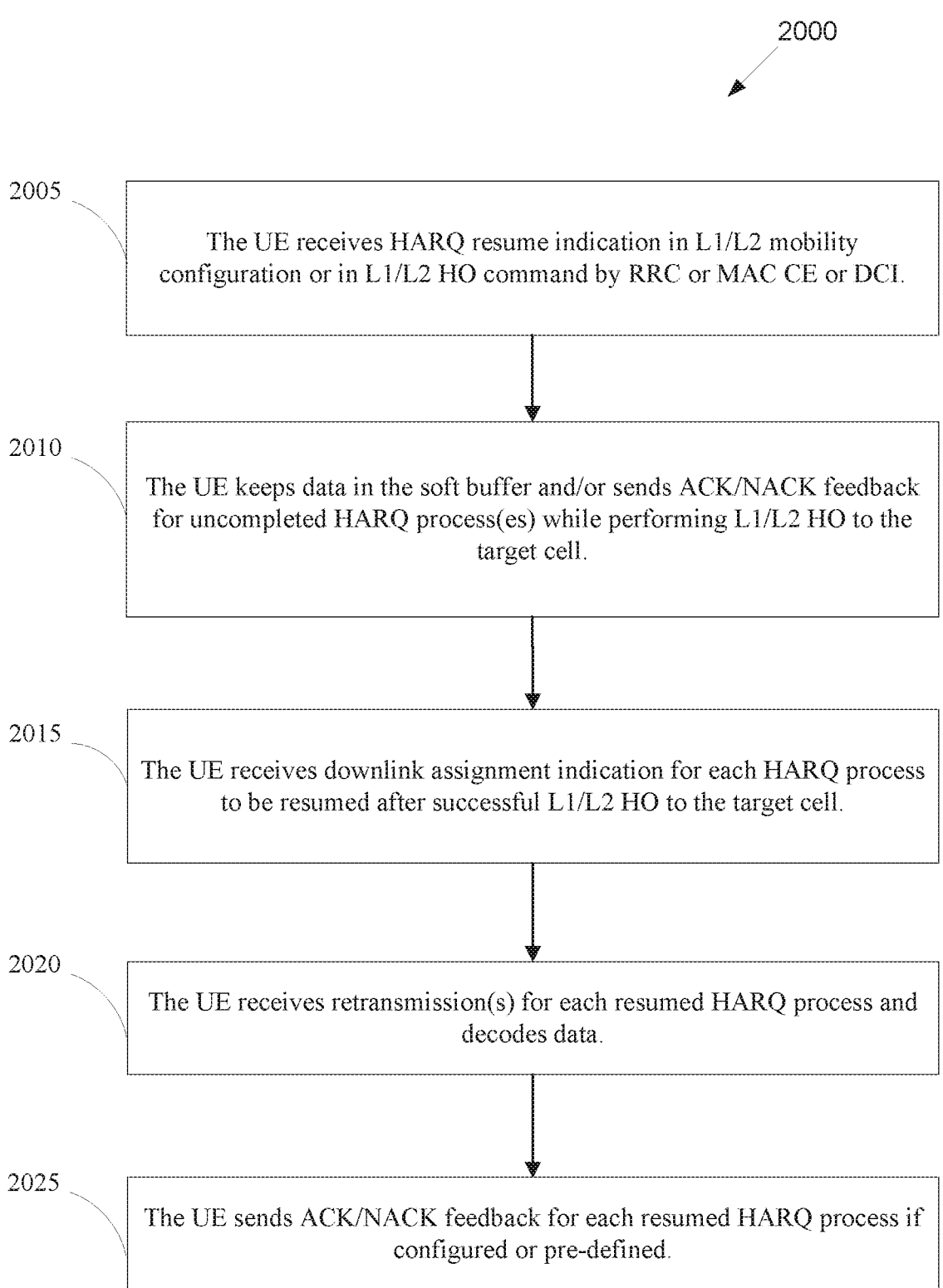

2000

2005 — The UE receives HARQ resume indication in L1/L2 mobility configuration or in L1/L2 HO command by RRC or MAC CE or DCI.

2010 — The UE keeps data in the soft buffer and/or sends ACK/NACK feedback for uncompleted HARQ process(es) while performing L1/L2 HO to the target cell.

2015 — The UE receives downlink assignment indication for each HARQ process to be resumed after successful L1/L2 HO to the target cell.

2020 — The UE receives retransmission(s) for each resumed HARQ process and decodes data.

2025 — The UE sends ACK/NACK feedback for each resumed HARQ process if configured or pre-defined.

FIG. 20

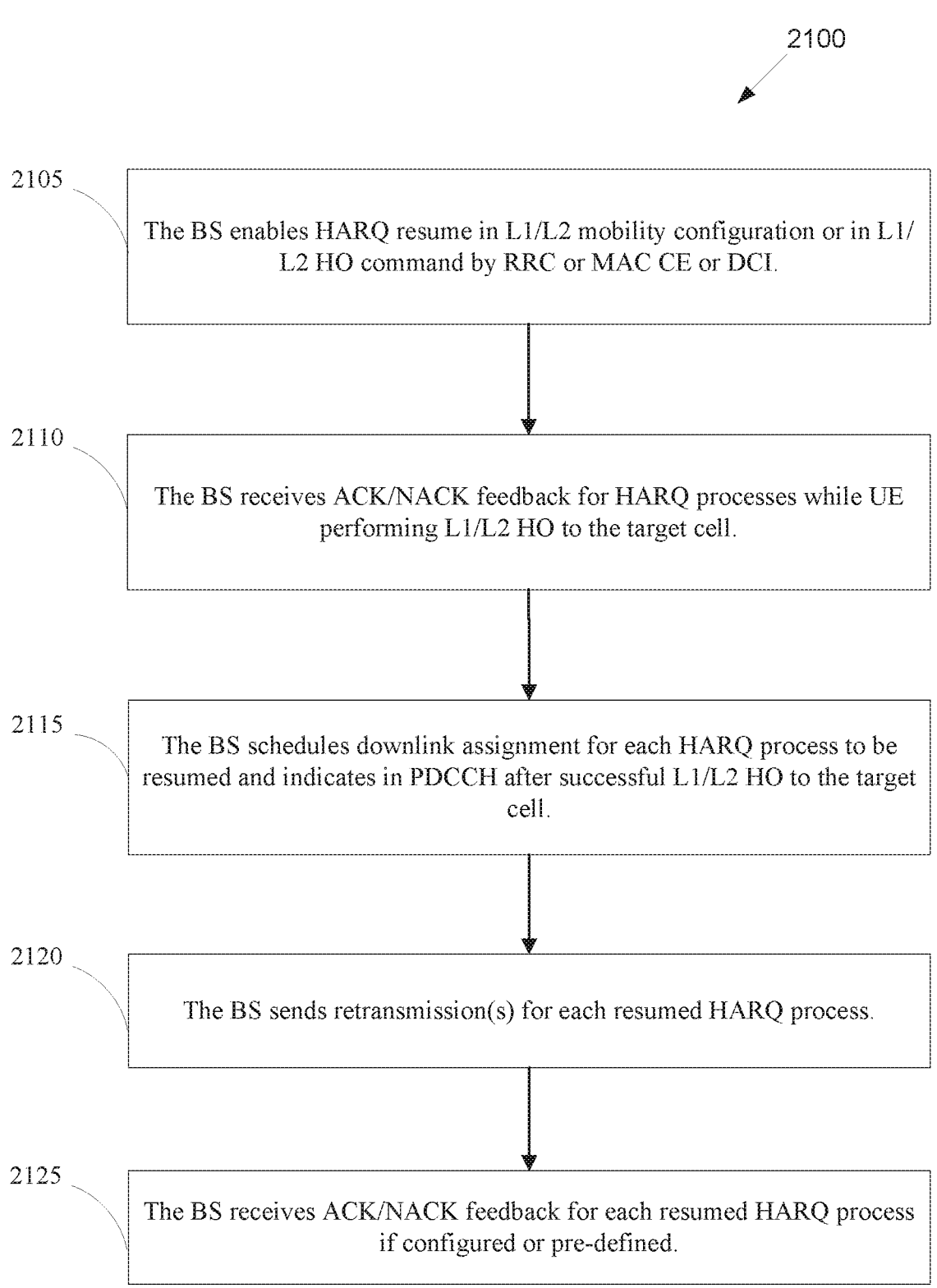

2100

2105 — The BS enables HARQ resume in L1/L2 mobility configuration or in L1/L2 HO command by RRC or MAC CE or DCI.

2110 — The BS receives ACK/NACK feedback for HARQ processes while UE performing L1/L2 HO to the target cell.

2115 — The BS schedules downlink assignment for each HARQ process to be resumed and indicates in PDCCH after successful L1/L2 HO to the target cell.

2120 — The BS sends retransmission(s) for each resumed HARQ process.

2125 — The BS receives ACK/NACK feedback for each resumed HARQ process if configured or pre-defined.

FIG. 21

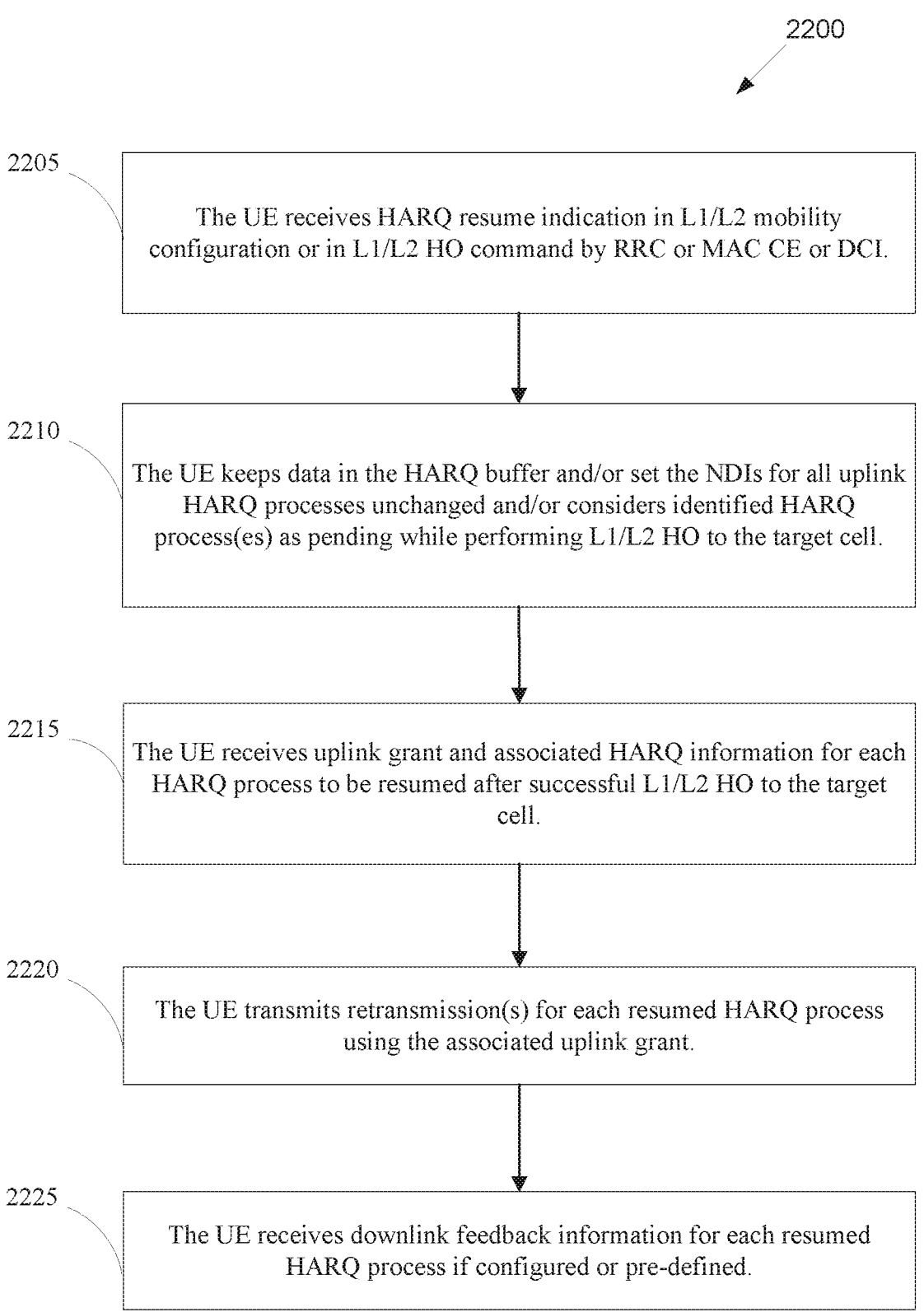

2200

2205

The UE receives HARQ resume indication in L1/L2 mobility configuration or in L1/L2 HO command by RRC or MAC CE or DCI.

2210

The UE keeps data in the HARQ buffer and/or set the NDIs for all uplink HARQ processes unchanged and/or considers identified HARQ process(es) as pending while performing L1/L2 HO to the target cell.

2215

The UE receives uplink grant and associated HARQ information for each HARQ process to be resumed after successful L1/L2 HO to the target cell.

2220

The UE transmits retransmission(s) for each resumed HARQ process using the associated uplink grant.

2225

The UE receives downlink feedback information for each resumed HARQ process if configured or pre-defined.

FIG. 22

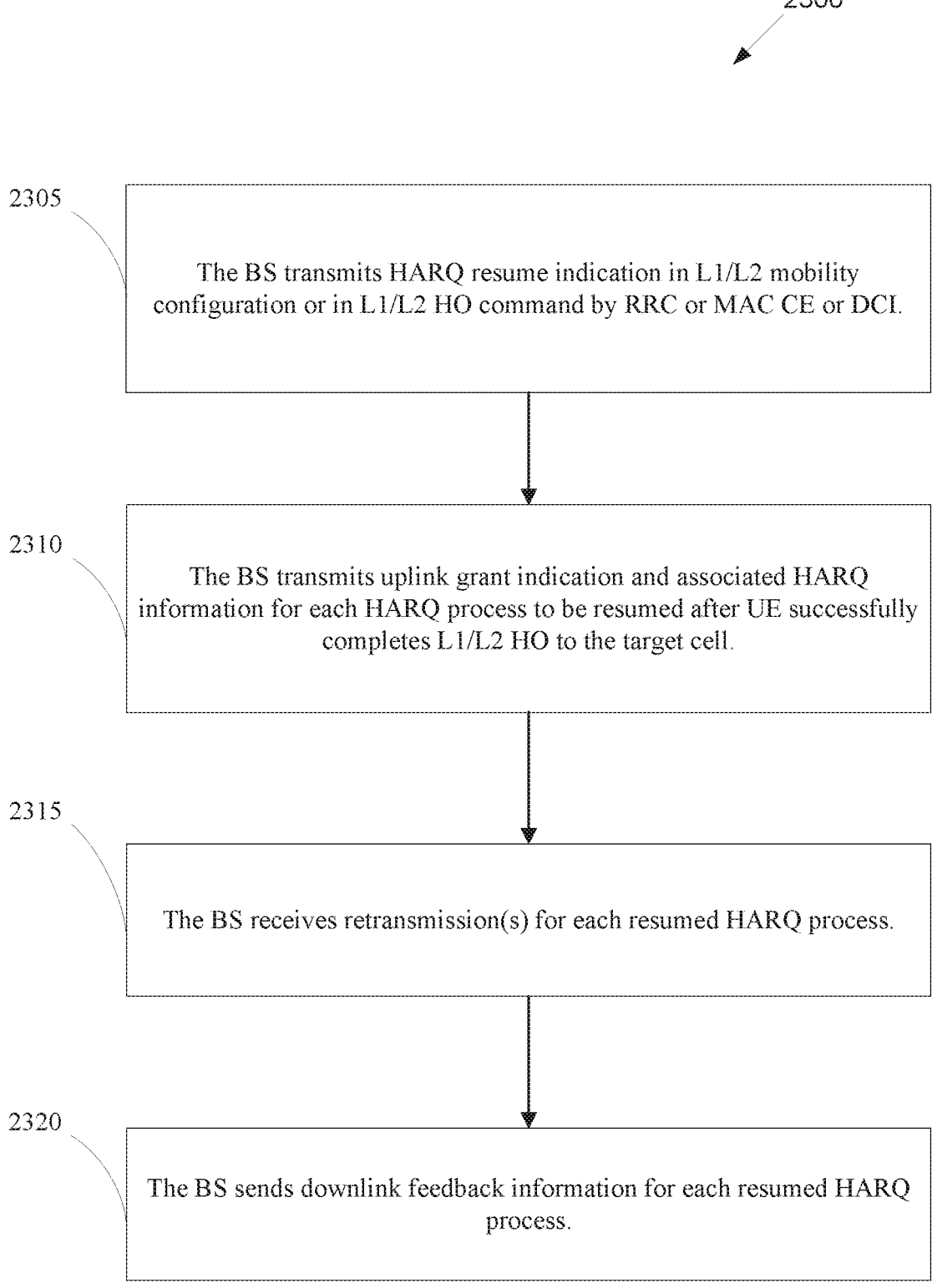

2300

2305

The BS transmits HARQ resume indication in L1/L2 mobility configuration or in L1/L2 HO command by RRC or MAC CE or DCI.

2310

The BS transmits uplink grant indication and associated HARQ information for each HARQ process to be resumed after UE successfully completes L1/L2 HO to the target cell.

2315

The BS receives retransmission(s) for each resumed HARQ process.

2320

The BS sends downlink feedback information for each resumed HARQ process.

FIG. 23

TIMING ADVANCE MANAGEMENT

CROSS-REFERENCE TO RELATED APPLICATIONS AND CLAIM OF PRIORITY

The present application claims priority to:

U.S. Provisional Patent Application No. 63/339,277, filed on May 6, 2022;

U.S. Provisional Patent Application No. 63/392,776, filed on Jul. 27, 2022; and

U.S. Provisional Patent Application No. 63/395,616, filed on Aug. 5, 2022. The contents of the above-identified patent documents are incorporated herein by reference.

TECHNICAL FIELD

The present disclosure relates generally to wireless communication systems and, more specifically, the present disclosure relates to timing advance management for multi-transmission reception point (TRP) and beam management in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to timing advance management for multi-TRP and beam management in a wireless communication system.

In one embodiment, a user equipment (UE) in a wireless communication system is provided. The UE includes a transceiver configured to receive, from a first base station (BS), a second timing advance group (TAG) identifier (ID) associated with a second BS and a physical downlink control channel (PDCCH) order. The UE further includes a processor operably coupled to the transceiver, the processor configured to initiate a contention-free random access (CFRA) procedure in response to receiving the PDCCH order. The transceiver of the UE is further configured to: transmit, to a second BS, a random access (RA) preamble, and receive, for the second BS, a timing advance (TA) command (TAC) included in a random access response (RAR) or in a medium access control control element (MAC CE). The processor of the UE is further configured to apply the TAC and start a second time alignment timer corresponding to the second TAG ID associated with the second BS.

In another embodiment, a method of UE is provided in a wireless communication system. The method comprises: receiving, from a first BS, a second TAG ID associated with a second BS and a PDCCH order; initiating a CFRA procedure in response to receiving the PDCCH order; transmitting, to a second BS, a RA preamble; receiving, for the second BS, a TAC included in a RAR or in a MAC CE; and applying the TAC and start a second time alignment timer corresponding to the second TAG ID associated with the second BS.

In yet another embodiment, a first BS in a wireless communication system is provided. The first BS includes a processor configured to generate a second TAG ID associated with a second BS and a PDCCH order. The BS further includes a transceiver operably coupled to the processor, the transceiver configured to transmit, to a UE, the second TAG ID associated with the second BS and the PDCCH order, wherein: a RA preamble is transmitted to the second BS based on a CFRA procedure in response to receiving the PDCCH order; a TAC, for the second BS, included in a RAR or in a MAC CE, is applied; and a second time alignment timer corresponding to the second TAG ID associated with the second BS is started.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flowchart of method for UE-based TA management according to embodiments of the present disclosure;

FIG. 7 illustrates a flowchart of method for a CFRA procedure according to embodiments of the present disclosure;

FIG. 8 illustrates a flowchart of method for a CFRA procedure triggered by a PDCCH order according to embodiments of the present disclosure.

FIG. 12 illustrates a flowchart of method for a UE behavior in network-based TA management according to embodiments of the present disclosure;

FIG. 13 illustrates a flowchart of method for a network behavior in network-based TA management according to embodiments of the present disclosure;

FIG. 14 illustrates a flowchart of method for a UE behavior in BFR-triggered L1/L2-based inter-cell mobility procedure without random access according to embodiments of the present disclosure;

FIG. 15 illustrates a flowchart of method for a UE behavior in BFR-triggered L1/L2-based inter-cell mobility procedure with random access according to embodiments of the present disclosure;

FIG. 18 illustrates a flowchart of method for a UE behavior in L1/L2-based mobility procedure with MAC reset/reconfiguration/(re)-establishment according to embodiments of the present disclosure;

FIG. 19 illustrates a flowchart of method for a UE behavior in L1/L2-based mobility procedure without MAC reset/reconfiguration/(re)-establishment according to embodiments of the present disclosure;

FIG. 20 illustrates a flowchart of method for a UE behavior for DL HARQ resume at L1/L2-based mobility according to embodiments of the present disclosure;

FIG. 21 illustrates a flowchart of method for a BS behavior for DL HARQ resume at L1/L2-based mobility according to embodiments of the present disclosure;

FIG. 22 illustrates a flowchart of method for a UE behavior for UL HARQ resume at L1/L2-based mobility according to embodiments of the present disclosure;

FIG. 23 illustrates a flowchart of method for a BS behavior for UL HARQ resume at L1/L2-based mobility according to embodiments of the present disclosure.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: "3GPP TS 38.300 v17.1.0, NR; NR and NG-RAN Overall description"; "3GPP TS 38.331 v17.1.0, NR; Radio Resource Control (RRC) protocol specification"; "3GPP TS 38.321 v17.1.0, NR; Medium Access Control (MAC) protocol specification;" "3GPP, TS 38.133 v17.6.0, 5G; NR; Requirements for support of radio resource management";

"3GPP, TS 38.306 v17.1.0, 5G; NR; User Equipment (UE) radio access capabilities"; and "3GPP, TS 38.213 v17.2.0, NR; Physical layer procedures for control."

Figure 1:
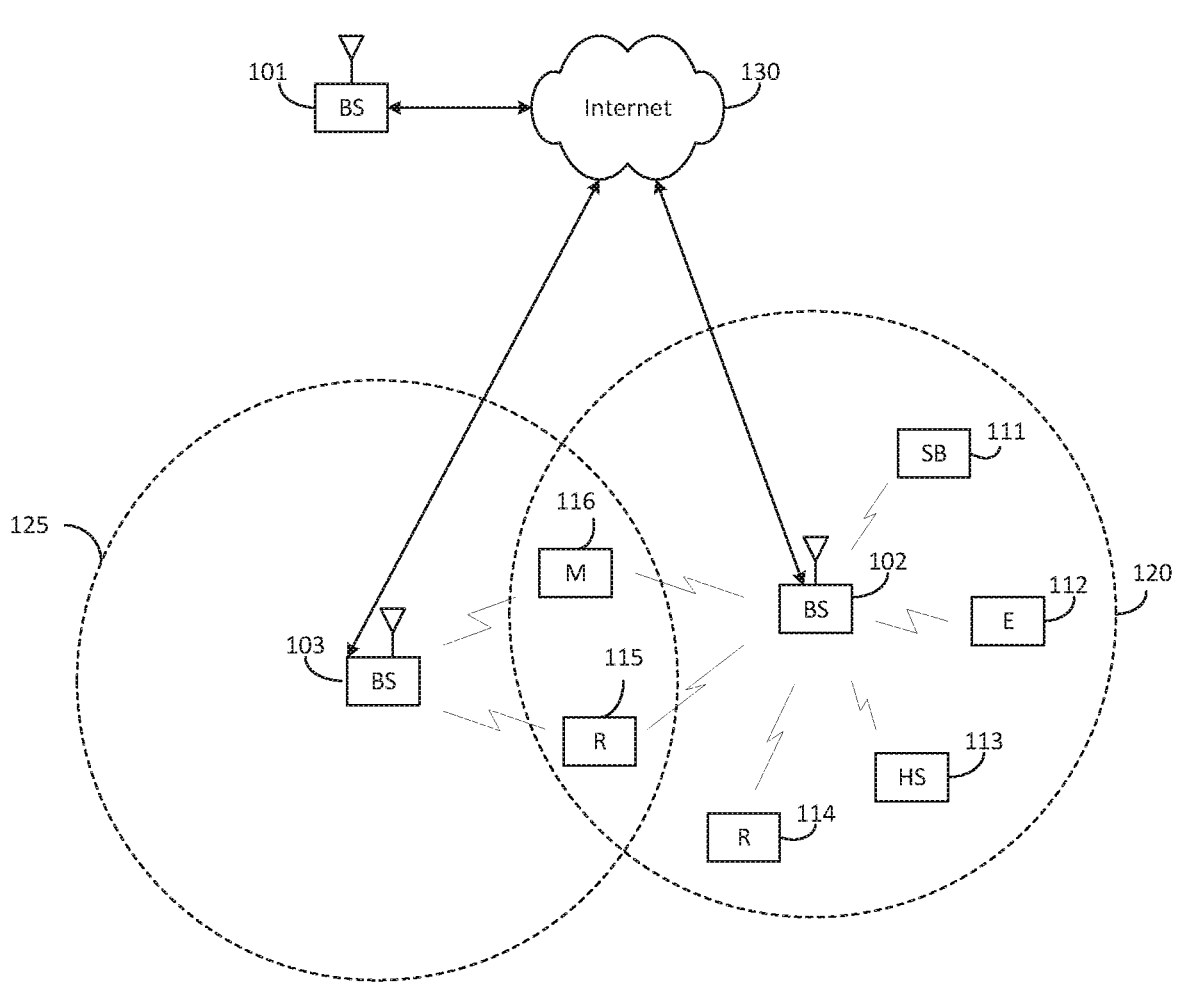
FIG. 1 illustrates an example of wireless network according to embodiments of the present disclosure.
Figure 2:
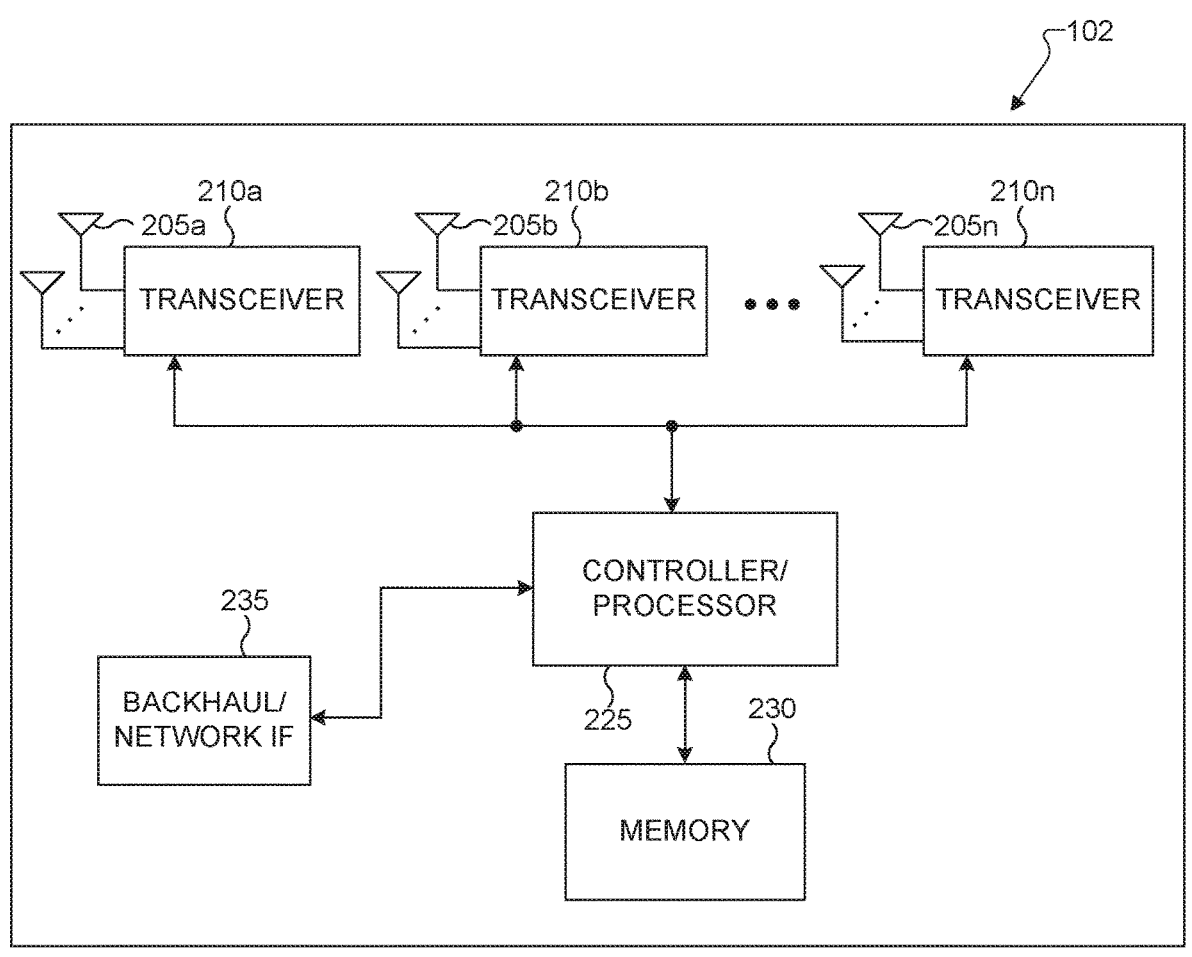
FIG. 2 illustrates an example of gNB according to embodiments of the present disclosure.
Figure 3:
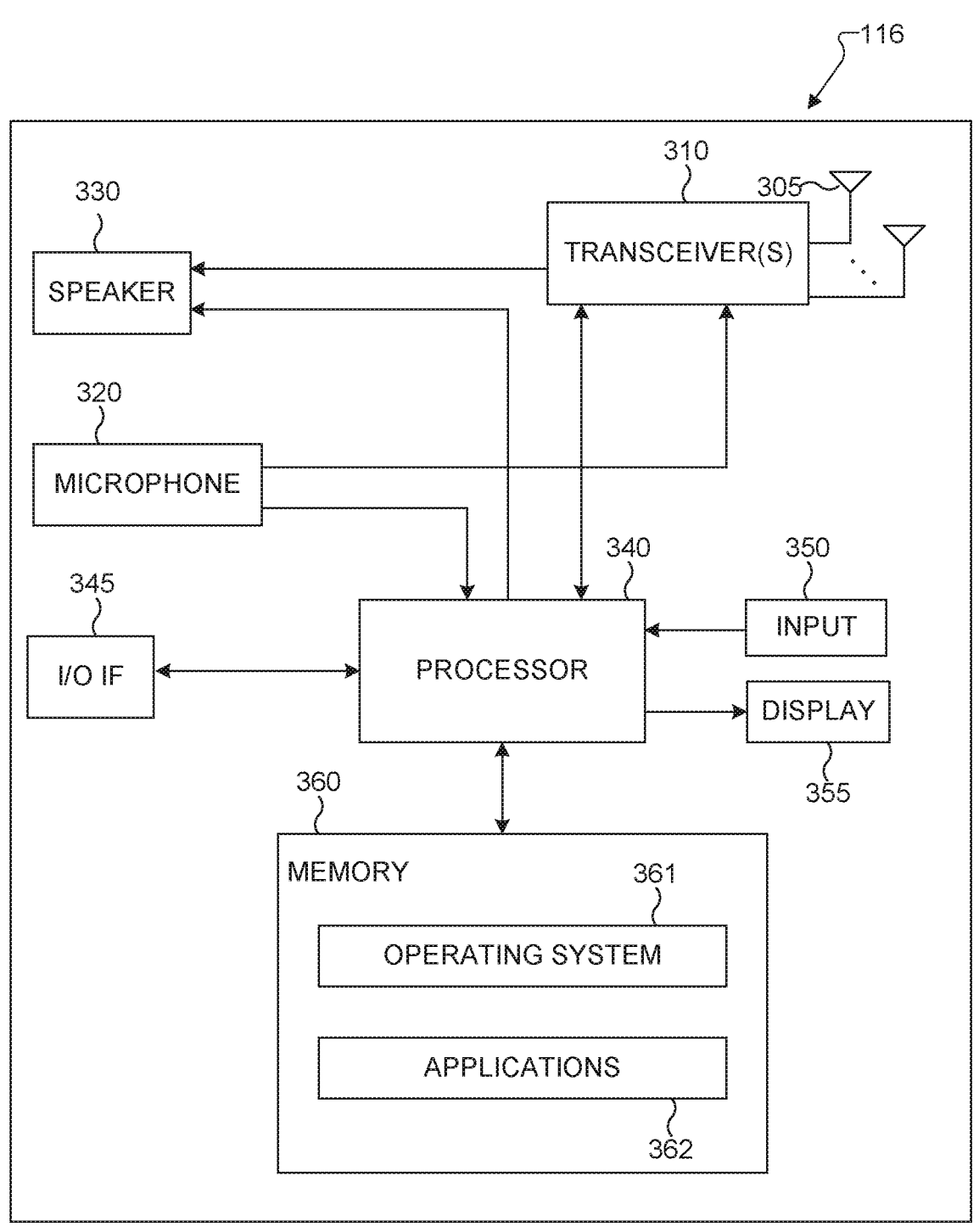
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for supporting timing advance management for multi-TRP and beam management in a wireless communication system. In certain embodiments, and one or more of the gNBs 101-103 includes circuitry, programing, or a combination thereof, for supporting timing advance management for multi-TRP and beam management in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for timing advance management for multi-TRP and beam management in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for timing advance management for multi-TRP and beam management in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
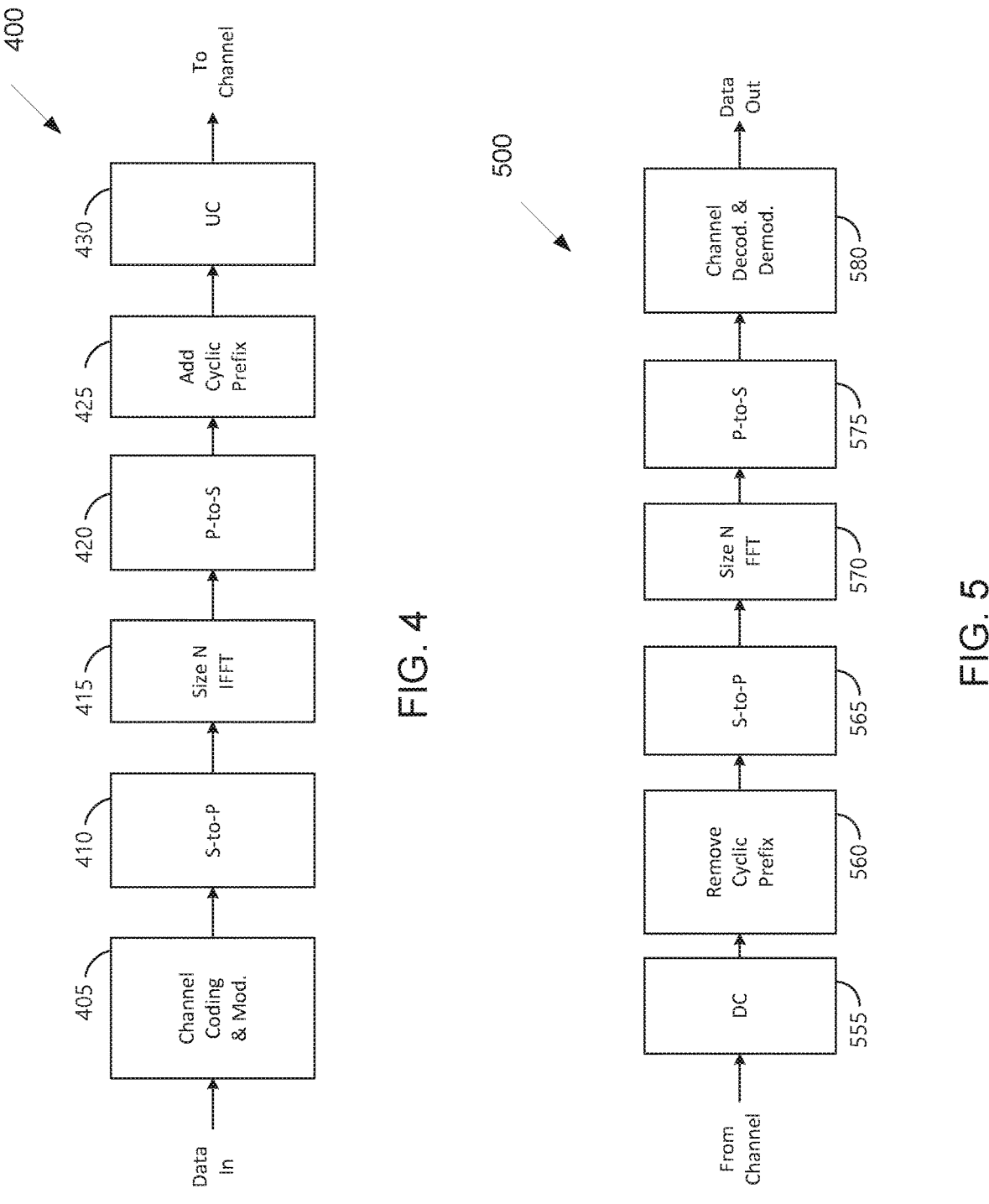
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support timing advance management for multi-TRP and beam management in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G NR. MIMO is one of the key technologies in NR systems and shows its success in commercial deployment. In multiple-TRP) operation, a serving cell can schedule the UE from two TRPs to provide better coverage, reliability and data rates for downlink and uplink transmission/receptions. Two operation modes are supported to schedule multi-TRP transmission: single-DCI for which the UE is scheduled by the same DCI for both TRPs and multi-DCI where the UE is scheduled by independent DCIs from each TRP.

In Rel-17, an inter-cell multi-TRP operation is introduced, where one TRP is from the serving cell and the other TRP can from a cell with PCI other than the serving cell, i.e., a non-serving cell, without the change of serving cell. For downlink multi-DCI transmission, one or more transmission configuration indicator (TCI) states can be associated with a synchronization signal/physical broadcast channel (PBCH) block (SSB) from the non-serving cell. The activated TCI states can be associated with at most one non-serving cell at a time. For uplink transmission, the UE transmits the same contents towards two TRPs with corresponding beam directions associated with different spatial relations.

In Rel-17, a single timing advance (TA) is maintained for multi-TRP operation and inter-cell beam management, assuming the transmission from/to two TRPs are synchronized within cyclic prefix (CP). Although the serving cell is not changed through the inter-cell multi-TRP operation, the TRP from the non-serving cell can be inter-distributed unit (DU) or intra-centralized unit (CU) which may have different propagation delay for UL transmission and may not be synchronized with the serving cell TRP. In such scenarios, two TAs are desired to be maintained by the UE for the serving cell.

In the present disclosure, TA management, where one or more TAs are maintained for a serving cell, is provided for example, in a multi-TRP operation, an inter-cell beam management operation, and in early UL synchronization for L1/L2 triggered mobility. RRC configuration and MAC procedures are specified. In the present disclosure, operations for a second TRP from a serving cell can also be applied to a TRP or TCI state(s) from a non-serving cell, vice versa. The operation on the TCI states associated with a non-serving cell can be applied to the non-serving cell. The non-serving cell can refer to an additional cell with PCI other than the serving cell PCI.

FIG. 6 illustrates a flowchart of method 600 for UE-based TA management according to embodiments of the present disclosure. The method 600 as may be performed by a UE (e.g., 111-116 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As shown in FIG. 6, at operation 605, the UE maintains the TA for the serving cell TRP and/or TCI states by the legacy UL timing alignment operation, i.e., adjust TA according to timing advance command (TAC) MAC CE and maintain the timeAlignmentTimer for the TAG to which the TAC MAC CE is intended. At operation 610, when configured/scheduled UL transmissions using TCI states associated with a second TRP and/or a non-serving cell, the UE establishes the initial TA for the TRP and/or TCI states. At operation 615, the UE maintains the TA for the TRP and/or TCI states by adjusting TA according to TAC MAC CE and/or maintaining UL timing alignment by the timeAlignmentTimer.

FIG. 7 illustrates a flowchart of method 700 for a CFRA procedure according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In one embodiment of UE-based TA management, the UE maintains more than one TAs for a serving cell and/or non-serving cell. For the multi-TRP operation, each TA is maintained for one TRP. For inter-cell beam management, other than the serving cell TA, a second TA is maintained for UL transmissions using TCI states associated with non-serving cell. As shown in FIG. 7, at operation 705, the UE maintains the first TA for the serving cell TRP and/or TCI states by the legacy UL timing alignment operation, i.e., adjust TA according to timing advance command (TAC) MAC CE and maintain the timeAlignmentTimer for the TAG to which the TAC MAC CE is intended. At operation 710, the UE establishes the second TA for the TRP and/or TCI states from the serving cell and/or the non-serving cell. At operation 715, the UE maintains the TAs for the TRP and/or TCI states by adjusting TAs according to TAC MAC CE and/or maintaining UL timing alignment by one or multiple timeAlignmentTimer.

As an embodiment of operation 710, the UE performs random access (e.g., contention-based random access (CBRA) or CFRA) to establish TA for DL/UL data transmission when the UE is out-of-synchronization for both the two TRPs, where the two TRPs can belong to the same serving cell, or one TRP belongs to the serving cell and the other TRP belongs to a non-serving cell. "Out-of-synchronization" can refer to the case that each TRP is associated with a time-alignment timer and both time-alignment timers for the two TRPs are expired. For an example, the UE initiates CBRA for one TRP belonging to the serving cell if CFRA is not configured. In another example, the UE initiates CFRA for one TRP that belongs to the serving cell and is configured with CFRA resources (e.g., preamble index).

As another embodiment of operation 710, the UE performs random access (e.g., CBRA or CFRA) to establish TA for DL/UL data transmission when the UE is out-of-synchronization for one TRP, where the TRP can belong to the serving cell, or to a non-serving cell. "Out-of-synchronization" can refer to the case that the time-alignment timer for the TRP is expired. As an example, the UE initiates CBRA for the TRP if CFRA is not configured. In another example, the UE initiates CFRA for the TRP if CFRA resources (e.g., preamble index) is configured.

In one embodiment of procedure 710, the UE performs random access (RA) to establish initial TA for the second TRP and/or for TCI states associated with the non-serving cell. As shown in FIG. 7, the UE can perform 4-step CFRA with procedures similar to beam failure recovery for SpCell. CFRA resources, e.g., preamble index, is allocated for an random access to establish initial TA to the second TRP or for TCI states associated with the non-serving cell by an RRC configuration (705). When scheduled to transmit using a TCI state associated with a second TRP or a non-serving cell, or when indicated to perform random access for UL synchronization with a second TRP or a non-serving cell, the UE triggers the CFRA procedure (710).

The UE sets the preamble index to the preconfigured ra-PreambleIndex corresponding to the SSB or CSI-RS associated with the TCI state to be used for the scheduled transmission (715), determines PRACH occasions that are associated with the SSB or applies the ra-OccasionList configured by RRC if the TCI state is associated with CSI-RS (720), and instructs the physical layer to transmit the RA Preamble using the selected PRACH occasion, preamble index, and PREAMBLE_RECEIVED_TARGET_POWER (725).

FIG. 8 illustrates a flowchart of method 800 for a CFRA procedure triggered by a PDCCH order according to embodiments of the present disclosure. The method 8000 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In another example as shown in FIG. 8, similar to the procedure to establish TA for SCell for a secondary TAG, the CFRA procedure is initiated by the gNB with a PDCCH order that is sent through the TRP and/or TCI states associated with the serving cell (805). Alternatively, the PDCCH order for CFRA can be sent through the second TRP and/or TCI states associated with the non-serving cell (805). For example, the PDDCH order is sent on a control resource set that is configured with a CORESET pool index indicating the associated TRP.

Upon receiving the PDCCH order, the UE sets preamble index to the ra-PreambleIndex signaled by PDCCH order (810), determines PRACH occasions that are associated with the SSB index indicated by the SSB index field of the PDCCH order (815), computes the RA-RNTI associated with the PRACH occasion in which the random access preamble is transmitted (820), and instructs the physical layer to transmit the RA Preamble using the selected PRACH occasion, corresponding RA-RNTI, preamble index, and PREAMBLE_RECEIVED_TARGET_POWER (825). The RA preamble transmission takes place on the second TRP or the non-serving cell in a way that the SSB index signaled in PDCCH order are associated with a TCI state for the second TRP or the non-serving cell.

SET pool configuration for multi-TRP operation, each TCI state or each CORESET pool can be configured with a TAG ID. Alternatively, in TAG configuration, one TAG ID can associate with a set of TCI states or associated with a CORESET pool ID, as shown in TABLE 1.

TABLE 1

```
-- ASN1START
-- TAG-TAG-CONFIG-START
TAG-Config ::= SEQUENCE {
tag-ToReleaseList SEQUENCE (SIZE (1..maxNrofTAGs)) OF TAG-Id OPTIONAL, -- Need N
tag-ToAddModList SEQUENCE (SIZE (1..maxNrofTAGs)) OF TAG OPTIONAL -- Need N
}
TAG ::= SEQUENCE {
  tag-Id TAG-Id,
  timeAlignmentTimer TimeAlignmentTimer,
  ...
[[
coresetPoolIndex INTEGER (0..1) OPTIONAL -- Need R
tci-StateId-List SEQUENCE (SIZE (1..maxNrofTCIperTAG)) OF TCI-StateId,
OPTIONAL -- Need R
]]
}
TAG-Id ::= INTEGER (0..maxNrofTAGs−1)
TimeAlignmentTimer ::= ENUMERATED {ms500, ms750, ms1280, ms1920, ms2560, ms5120,
ms10240, infinity}
-- TAG-TAG-CONFIG-STOP
-- ASN1STOP
```

After sending an RA preamble, the UE starts the ra-Response Window configured in RACH-ConfigCommon, monitor PDCCH in common search space for a random access response (RAR) identified by the C-RNTI or RA-RNTI while the ra-Response Window is running (730, 830). When the UE receives RAR, the UE applies the TAC received in the RAR for the TRP and/or TCI states (735, 835). If a TAG is preconfigured for the TRP and/or TCI states, the UE starts/restarts the timeAlignmentTimer associated with this TAG (740, 840). The UE can use the UL grant in the RAR for transmissions to the second TRP and/or using TCI states associated with the non-serving cell. The UE can ignore the TEMPORARY C-RNTI received in the RAR.

For another embodiment of operation 610, the TA determined by the network is indicated via L1 or L2 signaling and/or configured by RRC message from the serving gNB. In one example, the initial TA for UL transmissions using a TCI state associated with a second TRP and/or a non-serving cell can be indicated in the DCI which indicates the TCI state for the scheduled UL transmission. A new field can be introduced in DCI for a TA indication, or a reserved field can be used. The initial TA value can be indicated by a TA offset to the serving cell TA.

Figures 9, 10, 11:
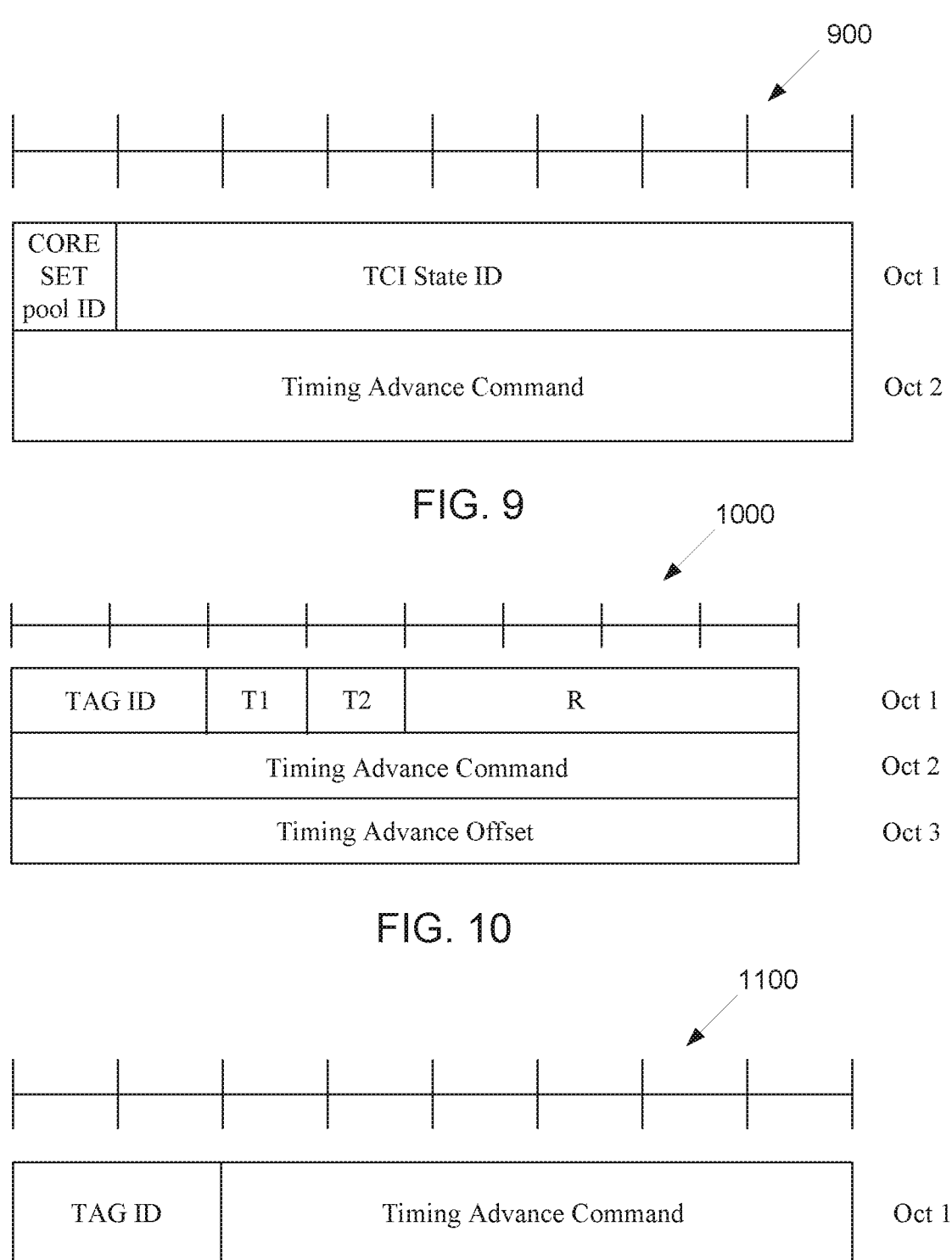
FIG. 9 illustrates an example of enhanced TAC MAC CE with TCI state ID according to embodiments of the present disclosure.
FIG. 10 illustrates an example of enhanced TAC MAC CE with two TAs according to embodiments of the present disclosure.
FIG. 11 illustrates an example of enhanced TAC MAC CE with TAG and TCI state ID according to embodiments of the present disclosure.

For one example, a new MAC CE can be introduced to indicate the TA for an UL transmission scheduled to use a TCI state associated with a second TRP and/or a non-serving cell. The new MAC CE can include the TCI state and/or a CORESET pool identifier (ID) and/or the corresponding TA and/or the associated TAG ID, using a MAC subheader with LCID or eLCID, as shown in FIG. 9 for an example. The TA value can be indicated by a TA offset to the serving cell TA or indicated as an absolute TA.

FIG. 9 illustrates an example of enhanced TAC MAC CE with a TCI state ID 900 according to embodiments of the present disclosure. An embodiment of the enhanced TAC MAC CE with a TCI state ID 900 shown in FIG. 9 is for illustration only.

For one example, in a TCI state configuration for multi-TRP and/or inter-cell beam management or in the CORE- When the UE is scheduled to use a TCI state associated with a second TRP and/or a non-serving cell, the TA can be indicated by the TAC MAC CE with a TAG ID associated with the TCI state. The new TAC MAC CE can be distinguished from the existing TAC MAC CE by using a MAC subheader with a different LCID or an eLCID.

For one example, the TA for a transmission using a TCI state associated with a second TRP and/or a non-serving cell can be indicated by a TA offset with respect to the serving cell TA in an enhanced TAC MAC CE which contains both the TA associated with the TAG ID for the serving cell and the TA offset to determine the TA for the second TRP or TCI states associated with the non-serving cell.

FIG. 10 illustrates an example of enhanced TAC MAC CE with two TAs 1000 according to embodiments of the present disclosure. An embodiment of the enhanced TAC MAC CE with two TAs 1000 shown in FIG. 10 is for illustration only.

An example is shown in FIG. 10, where the field T1 and T2 indicate whether the serving cell TA and the TA offset are indicated or not respectively, and the field Timing Advance Offset can include one bit for the positive/negative sign of the offset value.

For one example, the TA for a transmission using a TCI state associated with a second TRP and/or a non-serving cell can be configured by RRC. A common initial TA value can be configured for all TCI states associated with the second TRP or the non-serving cell. Alternatively, a group common initial TA value can be configured for a group of TCI states.

For operation 615, the UE maintains the TA for the second TRP and/or the TCI states associated with the non-serving cell. In the first embodiment, the UE maintains a separate TimeAlignmentTimer if a separate TAG ID is configured for the second TRP and/or for the TCI states associated with the non-serving cell. The TAG can be preconfigured by RRC as shown above, i.e., each TCI state or each CORESET pool is mapped to a TAG ID. An additional TAG ID for the second TRP for the serving cell can be configured in the serving cell configuration (e.g., servingCellConfig). A TAG ID associated with each non-serving cell can be configured in the serving cell configuration (e.g., servingCellConfig).

The UE starts/restarts the TimeAlignmentTimer associated with the TAG upon receiving a TA Command or RAR intended for the TAG and adjusting the TA according to TA Command or RAR; or upon obtained UL synchronization (e.g., by random access procedure) for the second TRP and/or the TCI states associated with the non-serving cell. The TAC can be contained in the MAC CE shown in FIG. 9 or in the MAC CE shown in FIG. 10 or in TAC MAC CE that is distinguished from the existing TAC MAC CE by using a MAC subheader with a different LCID or an eLCID.

If the timeAlignmentTimer is expired for the TAG associated with the second TRP or if the timeAlignmentTimer is expired for the TAG configured for the TCI states associated with the non-serving cell, while the timeAlignmentTimer for the first TRP is running, the UE may stop UL transmissions and/or notify RRC to release PUCCH and/or SRS and/or any configured downlink assignments and/or configured uplink grants and/or any PUSCH resource for semi-persistent CSI reporting that are associated with the second TRP and/or associated with the TCI states associated with the non-serving cell.

If both of the timeAlignmentTimer for the first TRP and the timeAlignmentTimer for the second TRP in a serving cell are expired, the UE stops UL transmissions and/or notify RRC to release PUCCH and/or SRS and/or any configured downlink assignments and/or configured uplink grants and/or any PUSCH resource for semi-persistent CSI reporting that are associated with the second TRP and/or associated with the TCI states associated with the non-serving cell.

If the network indicates by RRC or MAC CE that the second TRP is not scheduled or the TCI state(s) associated with the non-serving cell is deactivated, or if the maximum uplink transmission timing difference between the TAG for the serving cell TRP and the TAG for the second TRP is exceeded, the UE considers the TimeAlignmentTimer associated with the second TRP or the TimeAlignmentTimer associated with the TCI states from the non-serving cell is expired, the UE stops UL transmissions and/or release PUCCH and/or SRS and/or any configured downlink assignments and/or configured uplink grants and/or any PUSCH resource for semi-persistent CSI reporting that are associated with the second TRP and/or associated with the TCI states associated with the non-serving cell.

In one embodiment of operation 615, the UE maintains a single TimeAlignmentTimer with a single TAG ID configured for the serving cell, i.e., the TimeAlignmentTimer associated with the TAG for the serving cell is maintained as the legacy operation of UL timing alignment. In one example, to update the serving cell TA together with the TA for the second TRP and/or the TA for the TCI states associated with the non-serving cell, the network can send another request, e.g., PDCCH order, for UL synchronization by triggering random access, or the network can send the MAC CE shown in FIG. 10.

In one example, to independently update the TA for the second TRP and/or the TA for the TCI states associated with the non-serving cell, the network can send the MAC CE including a TAG ID and/or TA value and/or a CORESET pool ID and/or TCI state ID. An example is shown in FIG. 11, where the TAC is intended for the indicated TCI state ID or a CORESET pool ID associated with the indicated TAG. The single TimeAlignmentTimer is restarted when any one TA for the serving cell is updated or resynchornized, e.g., by MAC CE or random access procedure.

FIG. 11 illustrates an example of enhanced TAC MAC CE with TAG and TCI state ID 1100 according to embodiments of the present disclosure. An embodiment of the enhanced TAC MAC CE with TAG and TCI state ID 1100 shown in FIG. 11 is for illustration only.

If the network indicates by RRC or MAC CE that the second TRP is not scheduled or the TCI state(s) associated with the non-serving cell is deactivated, or if the maximum uplink transmission timing difference between the two TRPs is exceeded, the UE considers the TimeAlignmentTimer is expired, the UE stops UL transmissions and/or release PUCCH and/or SRS and/or any configured downlink assignments and/or configured uplink grants and/or any PUSCH resource for semi-persistent CSI reporting that are associated with the two TRPs or any TCI states.

In one embodiment of operation 615, the network configures a single TAG or two TAGs for multi-TRP operation or inter-cell beam management or early UL synchronization in L1/L2 triggered mobility according to UE capability. A UE capability indication can be introduced for whether the UE supports two TAGs (i.e., two timeAlignmentTimer) or a single TAG (i.e., a single timeAlignmentTimer) for the corresponding operation. This capability indication can be per UE or per band or per band combination.

FIG. 12 illustrates a flowchart of method 1200 for a UE behavior in network-based TA management according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In one embodiment of network-based TA management, the UE can maintain the TA for the TRP and/or beams from serving cell by the legacy UL timing alignment operation, i.e., adjusting TA according to TAC MAC CE and maintain the timeAlignmentTimer, as shown at operation 1205 in FIG. 12. For multi-TRP operation, when the UE is scheduled to transmit to a second TRP, the UE can apply the serving cell TA to the second TRP, assuming the TA for the second TRP is the same as the TA for the first TRP from the serving cell (1210). For inter-cell beam management, when the UE is scheduled to transmit using TCI states associated with a non-serving cell, the UE can apply the serving cell TA for UL transmissions using the TCI states associated with the non-serving cell, assuming the TAs for UL transmissions using the TCI states associated with the serving cell and the non-serving cell are the same.

FIG. 13 illustrates a flowchart of method 1300 for a network behavior in network-based TA management according to embodiments of the present disclosure. The method 1300 as may be performed by a BS (e.g., 101-103 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As shown in FIG. 13, the network can handle the TA difference between the two TRPs, if any. At operation 1305, the network, e.g., serving gNB, configures the multi-TRP operation and/or inter-cell beam management, schedules UL transmissions, and determines the TA for the second TRP and/or for TCI states associated with the non-serving cell. In an example, the TA for the second TRP can be estimated based on previous UL transmissions to that TRP. In another example, the TA for UL transmissions using TCI states associated with the non-serving cell can be estimated based on previous transmissions using TCI states from that non-serving cell.

As an example, the handling of TA for the second TRP and/or for the non-serving cell TCI states can be coordinated via DU-CU interface signaling if needed. At operation 1310, the network handles the TA for the second TRP and/or for TCI states associated with the non-serving cell, e.g., by pre-compensation any timing difference, when receiving any UL transmissions.

For a UE in a connected mode, mobility is controlled by the network with the assistance from the UE to maintain a good quality of connection. Based on the measurement on radio link quality of the serving cell and neighboring cell(s) reported by the UE, the network may hand over the UE to a neighboring cell that can provide better radio conditions when the UE is experiencing a degraded connection to the serving cell. In release-15 NR, the basic mechanism and procedure of network-controlled mobility in connected mode is developed. In release-16 NR, enhancements to network-controlled mobility in connected mode are introduced to mitigate connection interruption during handover procedure. Specifically, two enhanced handover mechanisms are developed, known as conditional handover (CHO) and dual active protocol stack (DAPS).

For mobility in a connected mode, the handover is initiated by the network via higher layer signaling, e.g., RRC message, based on L3 (Layer 3) measurements. However, this procedure involves more latency, signaling overhead and interruption time that may become the key issue in some scenarios with frequent handover, e.g., UE in high-speed vehicular and in FR2 deployment.

Reduction on overhead and/or latency and interruption time in a handover procedure is necessary. This brings the need of L1/L2 (Layer 1/Layer 2) inter-cell mobility, by which handover can be triggered by L1/L2 signaling based on L1 measurement. More specifically, L1/L2 based inter-cell mobility refers to a network-controlled mobility mechanism that hands over UE from the source cell to a target cell via inter-cell beam switching triggered by L1/L2 signaling, where the beam switching decision is based on L1 measurement on beams among neighboring cells.

On the other hand, beam failure detection (BFD) and beam failure recovery (BFR) has been supported since Release 15 and further enhanced in Release 16 and Release 17. For beam failure detection, the gNB configures the UE with beam failure detection reference signals (BFD-RS), which can be SSB or CSI-RS, as BFD-RS set(s) for each serving cell. If one BFD-RS set is configured for the serving cell, the UE declares beam failure on the serving cell when the number of beam failure instance indications from the physical layer reaches a configured threshold before a configured timer expires. If two BFD-RS sets are configured for the serving cell for beam failure detection in multi-TRP operation, each BFD-RS set is associated with a TRP, and the UE declares beam failure for a TRP when the number of beam failure instance indications associated with the corresponding BFD-RS set from the physical layer reaches a configured threshold before a configured timer expires.

For a beam failure recovery, if a beam failure is detected on the BFD-RS set for SpCell in case one BFD-RS set is configured, or if beam failure is detected on both BFD-RS sets for SpCell in case two BFD-RS set is configured, the UE triggers beam failure recovery by initiating a random access procedure on the SpCell, and selects a suitable beam to perform beam failure recovery if available. If the gNB has provided a dedicated random access resources for certain beams, those may be prioritized by the UE. In case of beam failure on one BFD-RS set of SpCell, a BFR MAC CE is included in MsgA/Msg3 for a contention-based random access.

In case of beam failure on both BFD-RS sets of SpCell, an enhanced BFR MAC CE is included in MsgA/Msg3. Upon completion of the random access procedure, beam failure recovery for SpCell is considered complete. If beam failure is detected on the BFD-RS set for an SCell in case one BFD-RS set is configured, or if beam failure is detected on the BFD-RS set for a TRP of serving cell, the UE triggers beam failure recovery by initiating a transmission of a BFR MAC CE for this SCell or an enhanced BFR MAC CE for the TRP of the serving cell, respectively.

A suitable beam for recovery for this SCell/TRP is selected if available and indicated in the MAC CE. Upon reception of a PDCCH indicating an uplink grant for a new transmission for the HARQ process used for the transmission of the MAC CE, beam failure recovery for this SCell/TRP is considered complete.

In Release 18, a new work item has been agreed to further enhance mobility in NR with the objective of the L1/L2 based inter-cell mobility. For L1/L2 based inter-cell mobility, the handover can be initiated/triggered/performed by beam switch indicated from physical layer. In conventional BFD/BFR procedure, upon beam failure is detected, the UE is switched to a new suitable beam for recovery for the current serving cell. However, in the scenarios of UE moving fast, beam failure may imply a need of handover that can be performed by the L1/L2-based inter-cell mobility. That is the UE can recovery beam failure by switching beam to a target cell, instead of selecting/switching to a beam within candidate beams from the current serving cell. Thus, the BFR-triggered L1/L2 based inter-cell mobility is desired to be developed.

The present disclosure includes a configuration, procedure, and signaling for L1/L2 based inter-cell mobility triggered by failure recovery with various embodiments.

FIG. 14 illustrates a flowchart of method 1400 for a UE behavior in BFR-triggered L1/L2-based inter-cell mobility procedure without a random access according to embodiments of the present disclosure. The method 1400 may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In one embodiment, the L1/L2 based inter-cell mobility can be triggered by BFR without a random access, as shown in FIG. 14.

At operation 1405, the UE receives RRC message, e.g., RRCReconfiguration, from the serving gNB for BFR triggered L1/L2 mobility configuration. The RRC message can provide an L1/L2 mobility configuration per serving cell or per cell group, which can include a candidate cell pool, and information included in ServingCellConfigCommon and/or ServingCellConfig and/or system information for each candidate cell. The candidate cells can include SpCell, SCell(s), the additional cell providing a second TRP in inter-cell multi-TRP operation, and any other inter-DU intra-CU cells.

The RRC message, e.g., RRCReconfiguration, can provide a BFD/BFR configuration per serving cell or per cell group, which can include BFD-RS sets, BFR-RS sets, BFD/

BFR relevant parameters, and information included in Radi-oLinkMonitoringConfig, and/or BeamFailureRecoveryCon-fig, and/or BeamFailureRecoveryRSConfig. The gNB can configures the UE with one set of BFD-RSs (i.e., SSB and/or periodic CSI-RS and/or aperiodic CSI-RS and/or semi-persistent CSI-RS) or two sets of BFD-RSs for multi-TRP operation each associated with a TRP, and one TRP can be from an additional cell other than the serving cell. The BFR-RS used for BFR that can trigger L1/L2 mobility can associate with one L1/L2 mobility candidate cell, and a new C-RNTI to be used as a new UE identity can be assigned for the handover to the candidate cell. The priority for candidate cells for BFR-triggered L1/L2 mobility can be configured.

The RRC message, e.g., RRCReconfiguration, can pro-vide an indication of enabling/disabling BFR-triggered L1/L2 mobility per serving cell or per cell group, which can be configured based on UE capability indication. A one-bit indication of UE's capability of supporting BFR-triggered L1/L2 mobility can be defined per UE or per band or per band combination or per FR, and sent by UE in UECapa-bilityInformation message upon the network request.

At operation 1410, the UE performs BFD on the BFD-RS set(s) for a serving cell. The UE declares beam failure for a BFD-RS set when the number of beam failure instance indications sent from physical layer reaches a configured threshold before a configured timer expires.

At operation 1415, if beam failure is detected on a BFD-RS set for a TRP of a serving cell, e.g., the SpCell or a SCell, the UE can trigger BFR by initiating a transmission of a MAC CE or SR. If BFR-triggered L1/L2 mobility is enabled in the configuration at operation 1405, the UE can recover beam failure by L1/L2 mobility; otherwise, i.e., if BFR-triggered L1/L2 mobility is not enabled, the UE can recover beam failure by convention BFR procedure.

For BFR-triggered L1/L2 mobility, the UE triggers BFR by initiating a transmission of a MAC CE or SR to the current serving cell or to the target cell if uplink grant is configured for the target cell. If at least one BFR for only one BFD-RS set has been triggered and not cancelled for an SpCell for which evaluation of the candidate beams accord-ing to the requirements as specified in 3GPP standard specification TS 38.133 has been completed, if UL-SCH resources are available for a new transmission and if the UL-SCH resources can accommodate the MAC CE plus its subheader as a result of LCP, the UE instructs the multi-plexing and assembly entity to generate the MAC CE and transmits the MAC CE in a MAC PDU.

Otherwise, if UL-SCH resources are not available for a new transmission, the UE triggers the SR for beam failure recovery.

The MAC CE can include a beam failure indication, and/or suitable new beam(s) for recovery if any, and/or HO request for BFR-triggered L1/L2 mobility. The beam failure indication can include whether beam failure is detected on the SpCell or on a specific SCell, and/or whether beam failure is detected for the serving cell on only one BFD-RS set or on both BFD-RS sets if two BFD-RS sets are configured, and/or whether suitable new beams are avail-able. A suitable new beam for recovery can be the beam whose L1 measurement for the associated RS is larger than or equal to the configured threshold. The L1-measurement can be configured as L1-RSRP, and/or SINR, and/or BLER, and/or CQI, and/or other quality metrics determined based on SSB or CSI-RS measurement, and/or any combination of these metrics. In another example, a suitable new beam for recovery can be the beam whose L1 measurement for the associated RS is larger than or equal to the configured threshold for at least a configured duration and/or for at least a configured number of times consecutively.

In one example, the latest measurement result before transmitting the MAC CE is used for selecting a suitable new beam. The suitable new beam(s) are selected from the BFR-RS set(s) associated with the BFD-RS set that beam failure is detected, and/or from the BFR-RS(s) configured for BRD-triggered L1/L2 mobility for the serving cell. If the suitable new beams are available, the corresponding RS indices are indicated.

In one example, an explicit HO request can be indicated in the MAC CE if the UE requests to handover to any one of candidate cells for each of which a suitable new beam for recovery is selected from the BFR-RS(s) configured for BRD-triggered L1/L2 mobility and is indicated in the MAC CE. Alternatively, if suitable new beams for recovery are selected from the BFR-RS(s) configured for BRD-triggered L1/L2 mobility and are indicated in the MAC CE, the UE implicitly indicates HO request, and the candidate cells are those with which the indicated suitable new beams are associated. In this case, the target cell for BFR-triggered L1/L2 mobility can be selected by the network from the candidate cells for which suitable new beams are indicated.

In another example, an explicit HO request can be indi-cated in the MAC CE if the UE requests to handover to a specific candidate cell for which a suitable new beam for recovery is selected from the BFR-RS(s) configured for BRD-triggered L1/L2 mobility and is indicated in the MAC CE. The cell ID of the UE selected target cell can be indicated. Alternatively, if only one suitable new beam for recovery is selected from the BFR-RS(s) configured for BRD-triggered L1/L2 mobility and is indicated in the MAC CE, the UE implicitly indicates HO request, and the target cell is the one with which the indicated suitable new beam is associated.

For a target cell selection from an L1/L2 mobility candi-date cell pool, the UE can select the target cell for which the BFR-RS(s) for BFR-triggered L1/L2 mobility are config-ured and a suitable new beam is available. If multiple cells are qualified, the UE can randomly choose one target cell; and/or the UE can choose a target cell according to the configured priority; and/or the UE can choose with the priority level from high to low in the order of the additional cell providing the second TRP, the SCells, and all the other candidate cells; and/or the UE can sort the qualified cells according to a configured metric and choose the 1st-ranked cell.

In another example, in case two BFR-RS sets are config-ured with one BFR-RS set for the TRP from the SpCell and the second BFR-RS set for the second TRP from the additional cell other than the SpCell, if at least one BFR for the BFD-RS set associated with the TRP of the SpCell has been triggered and not cancelled for which evaluation of the candidate beams according to the requirements as specified in 3GPP standard specification TS 38.133 has been com-pleted, the UE choose the additional cell providing the second TRP as the target cell to recover beam failure detected on the SpCell.

At operation 1420, upon reception of a PDCCH indicating an uplink grant for a new transmission for the HARQ process used for the transmission of the MAC CE, the UE considers the BFR is completed successfully, sets the beam failure counter (BFI COUNTER) of the BFD-RS set to 0, and cancels all the triggered BFRs of this BFD-RS set. In one example, if the PDCCH is addressed to the C-RNTI associated with a L1/L2 mobility candidate cell, the UE considers it as the HO command to that candidate cell. In another example, an explicit HO command can be included in the DCI format carried by the received PDCCH. For the TA of the new transmission to the target cell, in one example, the TA can be included in the DCI format carried by the received PDCCH. In another example, the TA for the new transmission to the target cell can be indicated in a MAC CE in PDSCH scheduled by the received PDCCH. In one more example, the UE can apply the TA pre-configured for the target cell in the L1/L2 mobility configuration at operation 1405.

At operation 1425, the UE switches to the target cell and applies the target cell configuration. Specifically, the UE monitors PDCCH in all CORESETs of the target cell, and receives PDSCH and aperiodic CSI-RS resource in a CSI-RS resource set using the same antenna port quasi co-location parameters as the ones associated with the corresponding selected RS associated with the target cell (i.e., the suitable new beam for the target cell indicated in the MAC CE at operation 1415). The UE transmits PUSCH, PUCCH and SRS that uses a same spatial domain filter as the one corresponding to the selected RS associated with the target cell (i.e., the suitable new beam for the target cell indicated in the MAC CE at operation 1415).

In another embodiment, the L1/L2 based inter-cell mobility can be triggered by BFR with a random access, as shown in FIG. 15.

FIG. 15 illustrates a flowchart of method 1500 for a UE behavior in a BFR-triggered L1/L2-based inter-cell mobility procedure with a random access according to embodiments of the present disclosure. The method 1500 as may be performed by a UE (e.g., 111-116 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

At operation 1505, the UE receives an RRC configuration, e.g., RRCReconfiguration, from the serving gNB for BFR triggered L1/L2 mobility. The RRC message can provide an L1/L2 mobility configuration per serving cell or per cell group, which can include a candidate cell pool, and information included in ServingCellConfigCommon and/or ServingCellConfig and/or system information for each candidate cell. The candidate cells can include SpCell, SCell(s), the additional cell providing a second TRP in inter-cell multi-TRP operation, and any other inter-DU intra-CU cells.

The RRC message, e.g., RRCReconfiguration, can provide a BFD/BFR configuration per serving cell or per cell group, which can include BFD-RS sets, BFR-RS sets, BFD/BFR relevant parameters, information included in RadioLinkMonitoringConfig, and/or BeamFailureRecoveryConfig, and/or BeamFailureRecoveryRSConfig. The gNB can configures the UE with one set of BFD-RSs (i.e., SSB and/or periodic CSI-RS and/or aperiodic CSI-RS and/or semi-persistent CSI-RS) or two sets of BFD-RSs for multi-TRP operation each associated with a TRP, and one TRP can be from an additional cell other than the serving cell. The BFR-RS used for BFR that can trigger L1/L2 mobility can associate with one L1/L2 mobility candidate cell. The dedicated RACH resource and/or information included in BeamFailureRecoveryConfig to be used in a random access procedure on L1/L2 mobility candidate cells can be configured associated with a candidate cell and/or associated with BFR-RS(s) for BFR-triggered L1/L2 mobility. A new C-RNTI to be used as a new UE identity can be assigned for the handover to the candidate cell. The priority for candidate cells for BFR-triggered L1/L2 mobility can be configured.

The RRC message, e.g., RRCReconfiguration, can provide an indication of enabling/disabling BFR-triggered L1/L2 mobility per serving cell or per cell group, which can be configured based on a UE capability indication. A one-bit indication of UE's capability of supporting BFR-triggered L1/L2 mobility can be defined per UE or per band or per band combination or per FR, and sent by UE in UECapabilityInformation message upon the network request.

At operation 1510, the UE performs BFD on the BFD-RS set(s) for a serving cell. The UE declares beam failure for a BFD-RS set when the number of beam failure instance indications sent from physical layer reaches a configured threshold before a configured timer expires.

At operation 1515, if beam failure is detected on at least one BFD-RS set for a TRP of a serving cell, e.g., the SpCell or a SCell, the UE can trigger BFR by initiating a random access procedure on a selected target cell to recover beam failure by L1/L2 mobility if BFR-triggered L1/L2 mobility is enabled in the RRC configuration at operation 1505. The UE can recovery beam failure via L1/L2 mobility with a random access for the following examples but not limited to.

In such example, if two BFR-RS sets are configured, at least one BFR for only one BFD-RS set has been triggered and not cancelled for the SpCell for which evaluation of the candidate beams according to the requirements as specified in 3GPP standard specification TS 38.133 has been completed.

In such example, if two BFR-RS sets are configured, the BFR is triggered for both BFD-RS sets of the SpCell and the BFR procedure is not successfully completed for any of the BFD-RS sets (i.e., the MAC entity has not sent out MAC PDU containing BFR MAC CE, or has not received PDCCH scheduling new transmission).

In such example, if one BFR-RS set is configured and beam failure is detected on the BFR-RS set for an SpCell.

In order to recover beam failure via L1/L2 mobility, for the target cell selection from an L1/L2 mobility candidate cell pool, the UE can select a target cell to perform a random access procedure, for which the BFR-RS(s) for BFR-triggered L1/L2 mobility are configured and the L1 measurement of at least one BFR-RS is larger than or equal to the configured threshold. The L1-measurement can be L1-RSRP, and/or SINR, and/or BLER, and/or CQI, and/or other quality metrics determined based on SSB and/or CSI-RS measurement, and/or any combination of these metrics.

In another example, the L1 measurement of at least one BFR-RS for BFR-triggered L1/L2 mobility is larger than or equal to the configured threshold for at least a configured duration and/or for at least a configured number of times consecutively. In one example, the latest measurement result before transmitting the MAC CE is used. If multiple cells are qualified, the UE can randomly choose one target cell; and/or the UE can choose a target cell according to the configured priority; and/or the UE can choose with the priority level from high to low in the order of the additional cell providing the second TRP, the SCells, and all the other candidate cells; and/or the UE can sort the qualified cells according to a configured metric and choose the 1st-ranked cell.

In another example, in case two BFR-RS sets are configured with one BFR-RS set for the TRP from the SpCell and the second BFR-RS set for the second TRP from the additional cell other than the SpCell, if at least one BFR for the BFD-RS set associated with the TRP of the SpCell has been triggered and not cancelled for which evaluation of the candidate beams according to the requirements as specified in 3GPP standard specification TS 38.133 has been completed, the UE recovers beam failure by initiating a random access procedure on the additional cell providing the second TRP.

If dedicated RACH resource (e.g., random access preambles and/or PRACH occasions) is configured for the target cell or for the BFR-RS(s) associated with the target cell, the UE can perform a contention-free random access to the target cell. Otherwise, the UE can perform a contention-based random access procedure. If both 2-step and 4-step RA type random access resources are configured and the RSRP of the downlink pathloss reference is above msgA-RSRP-Threshold, or if only 2-step RA type random access resources is configured, the UE chooses 2-step RA; otherwise, the UE chooses 4-step RA.

If the random access procedure on the target cell is initiated for SpCell beam failure recovery; and if RA triggered by BFR is configured for the target cell; and if ra-PrioritizationTwoStep is configured, the UE sets variable PREAMBLE_POWER_RAMPING_STEP to the power-RampingStepHighPriority included in the ra-Prioritization-TwoStep; if scalingFactorBI is configured in the ra-Prioritization-TwoStep, the UE sets variable SCALING_FACTOR_BI to the scalingFactorBI. If the UE performs 4-step RA; and if RA triggered by BFR is configured for the target cell, the UE starts the beamFailureRecoveryTimer, if configured; and applies the parameters powerRampingStep, preambleReceivedTargetPower, and preambleTransMax if configured.

If the UE performs 4-step RA; and if the beamFailureRecoveryTimer is either running or not configured; and if the contention-free random access resources for BFR-triggered L1/L2 mobility associated with any of the SSBs and/or CSI-RSs have been explicitly configured by RRC at operation 1505; and if at least one of the SSBs with SS-RSRP above rsrp-ThresholdSSB amongst the SSBs in configured BFR-RSs or the CSI-RSs with CSI-RSRP above rsrp-ThresholdCSI-RS amongst the CSI-RSs in configured BFR-RSs is available, the UE selects an SSB with SS-RSRP above rsrp-ThresholdSSB amongst the SSBs or a CSI-RS with CSI-RSRP above rsrp-ThresholdCSI-RS amongst the CSI-RSs. The UE sets the PREAMBLE_INDEX to a ra-PreambleIndex corresponding to the selected SSB or CSI-RS from the set of random access preambles configured in dedicated RA resources for BFR-triggered L1/L2 mobility. If CSI-RS is selected, and there is no ra-PreambleIndex associated with the selected CSI-RS, the UE sets the PREAMBLE_INDEX to a ra-PreambleIndex corresponding to the SSB in configured BFR-RSs which is quasi co-located with the selected CSI-RS.

For a contention-free random access, the UE transmits the random access preamble using the new C-RNTI associated with the target cell. Once the contention-free random access preamble is transmitted, the UE starts the ra-Response Window configured for RA on the target cell in BFR-triggered L1/L2 mobility, and monitors a PDCCH transmission on the search space configured for RA on the target cell in BFR-triggered L1/L2 mobility that is identified by the new C-RNTI while ra-ResponseWindow is running. For PDCCH monitoring and for corresponding PDSCH receptions, the UE assumes the same antenna port quasi-collocation parameters as the ones associated with the selected SSB or CSI-RS in a random access preamble transmission until the UE receives a MAC CE activation command for a TCI state. If a PDCCH is received and addressed to the new C-RNTI, the UE considers the random access procedure successfully completed.

For a contention-based random access, the UE transmits the random access preamble using the computed RA-RNTI which is associated with the PRACH occasion in which the random access preamble is transmitted. Once the contention-based random access preamble is transmitted, the UE starts the ra-Response Window configured for common RA procedures for the target cell and monitors the PDCCH for the target cell identified by the RA-RNTI while ra-Response Window is running. If a PDCCH is received and addressed to the RA-RNTI and if the RAR contains a MAC subPDU with a random access preamble identifier corresponding to the transmitted PREAMBLE_INDEX, the UE considers this RAR reception is successful.

In case 4-step contention-based and/or contention-free RA is performed, once RAR is received successful, if the UE is configured to send a MAC CE in an RA procedure on the target cell for BFR-triggered L1/L2 mobility; or if beam failure is detected on both BFD-RS sets of the serving cell, the UE sends a MAC CE in the subsequent uplink transmission (i.e., Msg3) using the uplink grant included in the RAR to indicate that beam failure is detected on the corresponding BFR-RS set(s). In case 2-step contention-based and/or contention-free RA is performed, if the UE is configured to send a MAC CE in an RA procedure on the target cell for BFR-triggered L1/L2 mobility; or if beam failure is detected on both BFD-RS sets of the serving cell, the UE sends a MAC CE in MsgA using the configured uplink grant to indicate that beam failure is detected on the corresponding BFR-RS set(s).

The MAC CE can include a beam failure indication, and/or suitable new beam(s) for recovery if any, and/or HO request for BFR-triggered L1/L2 mobility. The beam failure indication can include whether beam failure is detected on the SpCell or on a specific SCell, and/or whether beam failure is detected for the serving cell on only one BFD-RS set or on both BFD-RS sets if two BFD-RS sets are configured, and/or whether suitable new beams are available. A suitable new beam for recovery can be the beam whose L1 measurement for the associated RS is larger than or equal to the configured threshold. The L1-measurement can be configured as L1-RSRP, and/or SINR, and/or BLER, and/or CQI, and/or other quality metrics determined based on SSB and/or CSI-RS measurement, and/or any combination of these metrics.

In another example, a suitable new beam for recovery can be the beam whose L1 measurement for the associated RS is larger than or equal to the configured threshold for at least a configured duration and/or for at least a configured number of times consecutively. In one example, the latest measurement result before transmitting the MAC CE is used for selecting a suitable new beam. The suitable new beam(s) are selected from the BFR-RS set(s) associated with the BFD-RS set that beam failure is detected, and/or from the BFR-RS(s) configured for BRD-triggered L1/L2 mobility for the serving cell. If the suitable new beams are available, the corresponding RS indices are indicated.

At operation 1520, upon successful completion of the random access procedure to the target cell, the UE considers the BFR is completed, sets the beam failure counter (BFI COUNTER) to 0, stops the beamFailureRecoveryTimer if running.

At operation 1525, the UE switches to the target cell and applies the target cell configuration. Specifically, the UE monitors PDCCH in all CORESETs of the target cell, and receives PDSCH and aperiodic CSI-RS resource in a CSI-RS resource set using the same antenna port quasi co-location parameters as the ones associated with the SSB or CSI-RS selected in random access preamble transmission or as the one associated with the selected RS associated with the target cell (i.e., suitable new beam indicated in the MAC CE in Msg3 or MsgA transmission at operation 1515) until the UE receives a MAC CE activation command for a TCI state. The UE transmits PUSCH, PUCCH and SRS that uses a same spatial domain filter as the one corresponding to the SSB or CSI-RS selected in a random access preamble transmission or as the one corresponding to the selected RS associated with the target cell (i.e., the suitable new beam indicated in the MAC CE in Msg3 or MsgA transmission at operation 1515) until the UE receives a MAC CE activation command for a TCI state.

Similar to the BFR-triggered L1/L-based inter-cell 2 mobility, when HO failure occurs, e.g., L3 mobility failure, CHO failure, L1/L2-based inter-cell mobility failure, the UE can also trigger L1/L2-based inter-cell mobility to a new target cell. The embodiments in FIG. 14 and FIG. 15 can be applied with BFR replaced by HO failure recovery.

In one embodiment, the configuration at operation 1405/1505 for a BFR-triggered L1/L2-based inter-cell mobility procedure without/with a random access can be included in the configuration of candidate cells of L1/L2 mobility, e.g., in IE ServingCellConfig. 1n one example, the configuration for BFR-triggered L1/L2-based inter-cell mobility is contained in IE BeamFailureRecoveryHO-Config in Serving-CellConfig as follows. The maximum number of candidate cells enabling BFR-triggered L1/L2-based inter-cell mobility is indicated by maxNrofBFR-HO-Cells, which can be 8. The max number of candidate beams in the BFR-RS set for BFR-triggered L1/L2-based inter-cell mobility is indicated by maxNrofCandidateBeamsHO, which can be 16. The field beamFailureRecoveryHO-RA can include parameters in BeamFailureRecoveryConfig in the RRC specification. TABLE 2 shows beam failure recovery HO configuration information elements. TABLE 3 shows the description of beam failure recovery HO configuration information elements.

TABLE 2

```
-  BeamFailureRecoveryHO-Config
The IE BeamFailureRecoveryHO-Config is used to configure the UE with candidate beams for beam
failure recovery via L1/L2-based inter-cell mobility.
      BeamFailureRecoveryHO-Config information element
-- ASN1START
-- TAG-BEAMFAILURERECOVERYHO-CONFIG-START
BeamFailureRecoveryHO-Config ::= SEQUENCE {
  candidateBeamSetToRemoveList    CandidateBeamSetToRemoveList OPTIONAL, -- Need N
  candidateBeamSetToAddModList    CandidateBeamSetToAddModList OPTIONAL, -- Need N
  beamFailureRecoveryConfigToRemoveList    BeamFailureRecoveryConfigToRemoveList
OPTIONAL, -- Need N
  beamFailureRecoveryConfigToAddModList    BeamFailureRecoveryConfigToAddModList
OPTIONAL, -- Need N ...
}
CandidateBeamSetToRemoveList ::= SEQUENCE (SIZE (1..maxNrofBFR-HO-Cells)) OF
BeamFailureRecoveryHO-CellId
CandidateBeamSetToAddModList ::= SEQUENCE (SIZE (1..maxNrofBFR-HO-Cells)) OF
CandidateBeamSetToAddMod
CandidateBeamSetToAddMod ::= SEQUENCE {
   beamFailureRecoveryHO-CellId BeamFailureRecoveryHO-CellId,
   candiateCellId    CandidateCellId,
   newUE-Identity    RNTI-Value,
   rsrp-ThresholdBFR    RSRP-Range,
   candidateBeamRS-List    SEQUENCE (SIZE(1..maxNrofCandidateBeamsHO)) OF
CandidateBeamRS-HO, ...
}
BeamFailureRecoveryHO-CellId ::= INTEGER (0..maxNrofBFR-HO-Cells–1)
CandidateBeamRS-HO    CHOICE {
  ssb    SSB-Index,
  csi-RS    NZP-CSI-RS-ResourceId
BeamFailureRecoveryConfigToRemoveList ::= SEQUENCE (SIZE (1..maxNrofBFR-HO-Cells)) OF
BeamFailureRecoveryHO-CellId
BeamFailureRecoveryConfigToAddModList ::= SEQUENCE (SIZE (1..maxNrofBFR-HO-Cells))
OF BeamFailureRecoveryConfigToAddMod
BeamFailureRecoveryConfigToAddMod ::= SEQUENCE {
   beamFailureRecoveryHO-CellId    BeamFailureRecoveryHO-CellId,
   candiateCellId    CandidateCellId,
   newUE-Identity    RNTI-Value,
   beamFailureRecoveryHO-RA    BeamFailureRecoveryConfig
}
-- TAG-BEAMFAILURERECOVERYHO-CONFIG-STOP
-- ASN1STOP
```

TABLE 3

| BeamFailureRecoveryHO-Config field descriptions |
| --- |
| beamFailureRecoveryHO-CellId<br>Indicates the index of the candidate cell for recovery via L1/L2 inter-cell mobility.<br>candidateBeamRS-List<br>A list of reference signals (CSI-RS and/or SSB) identifying the candidate beams for recovery via L1/L2 inter-cell mobility without random access..<br>candiateCellId<br>Indicates the index of the candidate cell configured in the candidate cell pool for L1/L2 inter-cell mobility.<br>newUE-Identity<br>Indicates the UE identity during the handover to the candidate cell in BFR-triggered L1/L2 inter-cell mobility.<br>beamFailureRecoveryHO-RA<br>Configures the UE with RACH resources and candidate beams for beam failure recovery via L1/L2 inter-cell mobility with random access.<br>rsrp-ThresholdBFR<br>L1-RSRP threshold used for determining whether a candidate beam may be included by the UE in BFR MAC CE. |

Figure 16:
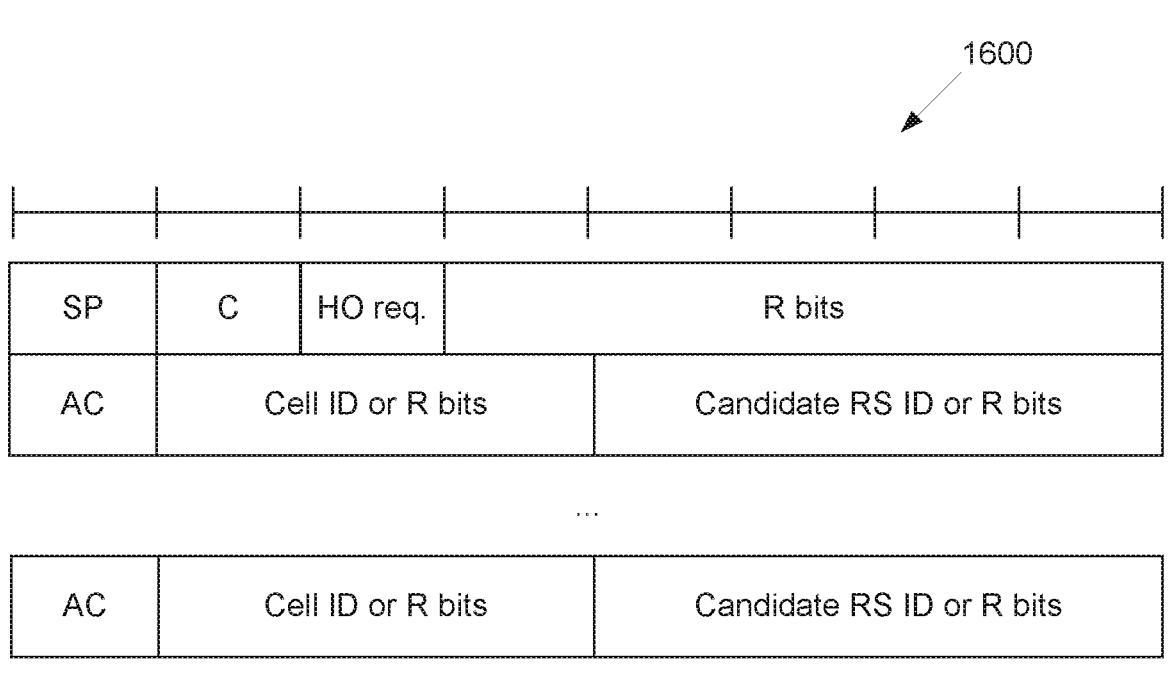
FIG. 16 illustrates an example of BFR-HO MAC CE according to embodiments of the present disclosure.

FIG. 16 illustrates an example of BFR-HO MAC CE 1600 according to embodiments of the present disclosure. An embodiment of the BFR-HO MAC CE 1600 shown in FIG. 16 is for illustration only.

Figure 17:
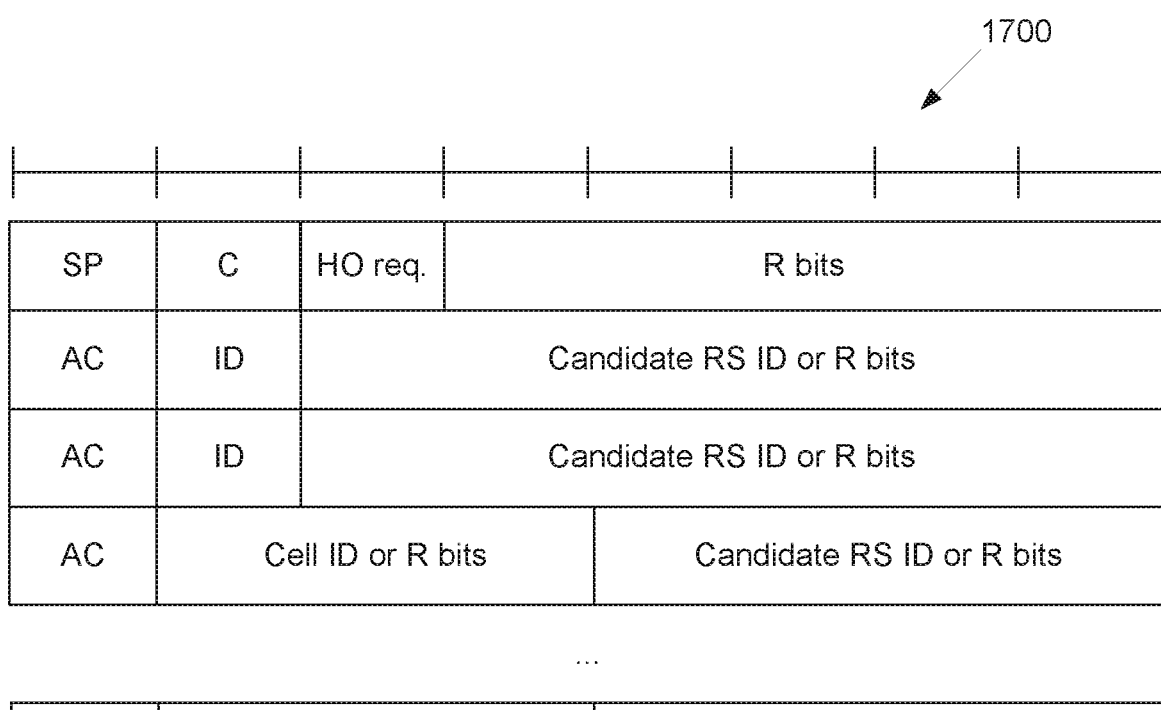
FIG. 17 illustrates another example of BFR-HO MAC CE according to embodiments of the present disclosure.

FIG. 17 illustrates another example of BFR-HO MAC CE 1700 according to embodiments of the present disclosure. An embodiment of the BFR-HO MAC CE 1700 shown in FIG. 17 is for illustration only.

In one embodiment, the MAC CE transmitted by the UE at operation 1415/1515 can be identified by a MAC sub-header with LCID or by a MAC subheader with eLCID. The MAC CE can consist of any combination of following fields. Two example are shown in FIG. 16 and FIG. 17. In FIGS. 16 and 17, followings are defined.

SP: this field indicates whether the beam failure is detected on the BFD-RS set(s) for the SpCell or a SCell. The SP field set to 1 indicates that the beam failure is detected on the BFD-RS set(s) for the SpCell; otherwise, the field is set to 0.

C: this field indicates whether the beam failure is detected on only one BFD-RS set or on two BFD-RS sets for the serving cell. The C field set to 1 indicates that the beam failure is detected on two BFD-RS sets for the serving cell if two BFD-RS sets are configured. The C field set to 0 indicates that the beam failure is detected on only one BFD-RS set of the serving cell if two BFD-RS sets are configured. If only one BFD-RS set is configured, the C field is set to 0.

HO request: this field indicates whether the UE requests for handover when the MAC CE is sent in BFR-triggered L1/L2 mobility operation without a random access. The HO request field set to 1 indicates that the UE requests for handover to one of the candidate cell(s) whose Candidate RS is indicated in the MAC CE in BFR-triggered L1/L2 mobil-ity operation without a random access; otherwise, the HO request field is set to 0. If the MAC CE is sent in BFR-triggered L1/L2 mobility operation with a random access, this field is reserved with R bits.

AC: this field indicates the presence of the (Cell) ID field and the candidate RS ID field in this octet. If at least one of the SSBs with SS-RSRP above rsrp-ThresholdBFR or rsrp-ThresholdSSB amongst the SSBs in list of candidate beams for the candidate cell or the CSI-RSs with CSI-RSRP above rsrp-ThresholdBFR or rsrp-ThresholdCSI-RS amongst the CSI-RSs in list of candidate beams for the candidate cell is available, the AC field is set to 1; otherwise, the field is set to 0. If the AC field set to 1, the cell ID field and the candidate RS ID field is present. If the AC field set to 0, R bits are present instead.

ID: this field indicates the identity of the BFD-RS set. The field is set to 0 if this octet corresponds to the 1$^{st}$ BFD-RS set associated with the TRP from the SpCell. The field is set to 1 if this octet corresponds to the 2nd BFD-RS set associated with the second TRP from the SpCell or with the TRP from the additional cell other than the SpCell. For the Serving cell not configured with two BFD-RS sets, this field is set to 0;

Cell ID: this field indicates the index of the candidate cell, which is configured by BeamFailureRecoveryHO-CellId. If the MAC CE is sent in BFR-triggered L1/L2 mobility operation with a random access, this field is reserved with R bits.

Candidate RS ID: this field is set to the index of an SSB with SS-RSRP above rsrp-ThresholdBFR or rsrp-Threshold-SSB amongst the SSBs in list of candidate beams for the candidate cell or to the index of a CSI-RS with CSI-RSRP above rsrp-ThresholdBFR or rsrp-ThresholdCSI-RS amongst the CSI-RSs in the list of candidate beams for the candidate cell. Index of an SSB or CSI-RS is the index of an entry in the list of candidate beams corresponding to the SSB or CSI-RS. Index 0 corresponds to the first entry in the list of candidate beams, index 1 corresponds to the second entry in the list and so on. The length of this field is 6 bits;

R: reserved bit, set to "0."

For a UE in a connected mode, mobility is controlled by the network with the assistance from the UE to maintain a good quality of connection. Based on the measurement on radio link quality of the serving cell and neighboring cell(s) reported by the UE, the network may hand over the UE to a neighboring cell that can provide better radio conditions when the UE is experiencing a degraded connection to the serving cell. In release-15 NR, the basic mechanism and procedure of network-controlled mobility in a connected mode is developed. In release-16 NR, enhancements to network-controlled mobility in a connected mode are intro-duced to mitigate connection interruption during handover procedure. Specifically, two enhanced handover mecha-nisms are developed, known as a CHO and a DAPS.

For mobility in a connected mode, the handover is initi-ated by the network via higher layer signaling, e.g., RRC message, based on L3 (Layer 3) measurements. However, this procedure involves more latency, signaling overhead and interruption time that may become the key issue in some scenarios with frequent handover, e.g., UE in high-speed vehicular and in FR2 deployment. Reduction on overhead and/or latency and interruption time in a handover procedure is necessary. This brings the need of L1/L2 (Layer 1/Layer 2) inter-cell mobility, by which handover can be triggered by L1/L2 signaling based on L1 measurement.

More specifically, L1/L2 based inter-cell mobility refers to a network-controlled mobility mechanism that hands over UE from the source cell to a target cell via inter-cell beam switching triggered by L1/L2 signaling, where the beam switching decision is based on L1 measurement on beams among neighboring cells.

In Release 18, a new work item has been agreed to further enhance mobility in NR with the objective of the L1/L2 based inter-cell mobility. For L1/L2 based inter-cell mobil-ity, the handover can be initiated/triggered/performed by beam switch indicated from physical layer. The operation on MAC procedures, e.g., HARQ process, during L1/L2 han-dover are desired to be specified.

In the present disclosure, how MAC procedures including HARQ processes are operated during L1/L2 based inter-cell mobility is specified. Full MAC reset and partial MAC reset operations for L1/L2 triggered mobility are included.

For one embodiment, the L1/L2-based inter-cell mobility procedure with full MAC reset/reconfiguration/(re)-establishment is illustrated in FIG. 18 for the UE behavior.

FIG. 18 illustrates a flowchart of method 1800 for a UE behavior in an L1/L2-based mobility procedure with MAC reset/reconfiguration/(re)-establishment according to embodiments of the present disclosure. The method 1800 as may be performed by a UE (e.g., 111-116 as illustrated in FIG. 1). An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

In FIG. 18, the UE performs the L1/L2-based handover (HO) procedure without time to trigger. At operation 1805, the UE receives RRCReconfiguration message(s) for an L1/L2-based mobility configuration from the serving gNB, including candidate cell PCI and/or logical ID, and/or a transmission configuration indicator (TCI) state configuration, and/or a measurement and reporting configuration, and/or a common/dedicated serving cell configuration for candidate cells.

At operation 1810, the UE sends RRCReconfiguration-Complete message to the serving gNB. At operation 1815, the UE performs measurement for the SSB(s) and/or CSI-RS(s) of serving cell and candidate cells and reports separate or joint measurement results including L1-RSRP(s) of serving cell and candidate cells to the serving gNB. At operation 1820, the UE receives L1/L2 signaling from the serving gNB that triggers the HO to the target cell. At operation 1825, the UE performs HO to the target cell with MAC reset/reconfiguration/(re)-establishment and applies the target cell configuration that is pre-configured by the RRCReconfiguration message.

In one example of operation 1825, the UE triggers a reset/reconfiguration/(re)-establishment of the MAC entity if the target cell configuration includes reconfiguration with sync; and/or if a random access procedure is performed for the L1/L2 handover to the target cell. In another example, the UE triggers a reset/reconfiguration/(re)-establishment of the MAC entity if the NW requests/indicates MAC reset/reconfiguration/(re)-establishment for the L1/L2 handover to the target cell in a pre-configured L1/L2 mobility configuration at operation 1805 or in L1/L2 HO command by RRC message or MAC CE or DCI with an explicit or implicit indication of MAC reset/reconfiguration/(re)-establishment at operation 1820.

In one more example, the UE performs MAC reset/reconfiguration/(re)-establishment if the target cell configuration at operation 405 includes MAC configuration, e.g., mac-CellGroupConfig.

In one example, the UE performs full MAC reset/reconfiguration/(re)-establishment and/or performs PDCP sequence number (SN) and hyper frame number (HFN) reset for RLC-AM bearers and/or for RLC-UM bearers and/or preforms PDCP/RLC entity reconfiguration/(re)-establishment if the HO command received at operation 1820 explicitly or implicitly indicates that the HO is inter-DU. In an example, the UE can know the HO is inter-DU if the target cell and the source cell are from different cell group by explicit indication (e.g., configured with different cell group ID); or if the target cell is not one of the SCells configured in the cell group of the source cell; or if the target cell and the source cell are associated with different cell group configurations; or the HO command indicates a cell group configuration ID to be applied for the target cell that is different from the source cell's cell group configuration ID.

If full MAC reset is triggered, the MAC entity may: (1) initialize B1 for each logical channel to zero; (2) stop (if running) all timers, except MBS broadcast DRX timers; (3) consider all timeAlignmentTimers, inactivePosSRS-Time-AlignmentTimer, and cg-SDT-TimeAlignmentTimer, if configured, as expired and perform the corresponding actions; (4) set the NDIs for all uplink HARQ processes to the value 0; (5) set the NDIs for all HARQ process IDs to the value 0 for monitoring PDCCH in a sidelink resource allocation mode 1; (6) stop, if any, an ongoing random access procedure; (7) discard explicitly signaled contention-free random access resources for 4-step RA type and 2-step RA type, if any; (8) flush Msg3 buffer; (9) flush MSGA buffer; (10) cancel, if any, triggered scheduling request procedure; (11) cancel, if any, triggered buffer status reporting procedure; (12) cancel, if any, triggered power headroom reporting procedure; (13) cancel, if any, triggered consistent LBT failure; (14) cancel, if any, triggered BFR; (15) cancel, if any, triggered sidelink buffer status reporting procedure; (16) cancel, if any, triggered pre-emptive buffer status reporting procedure; (17) cancel, if any, triggered timing advance reporting procedure; (18) cancel, if any, triggered recommended bit rate query procedure; (19) cancel, if any, triggered configured uplink grant confirmation; (20) cancel, if any, triggered configured sidelink grant confirmation; (21) cancel, if any, triggered desired guard symbol query; (22) cancel, if any, triggered positioning measurement gap activation/deactivation request procedure; (23) cancel, if any, triggered SDT procedure; (24) flush the soft buffers for all DL HARQ processes, except for the DL HARQ process being used for MBS broadcast; (25) for each DL HARQ process, consider the next received transmission for a TB as the very first transmission; (26) release, if any, Temporary C-RNTI; and (27) reset all LBT_COUNTERs.

If a MAC reconfiguration is triggered, the UE reconfigures the MAC main configuration of the cell group of the target cell in accordance with the received mac-CellGroupConfig in the target cell configuration at operation 1805.

If MAC (re)-establishment is triggered, in one example, the UE create a MAC entity for the cell group of the target cell with the same configuration as the MAC entity for the source cell group. In another example, the UE create a MAC entity for the cell group of the target cell in accordance with the received mac-CellGroupConfig in the target cell configuration at operation 1805. In one more example, the UE applies the default MAC cell group configuration as specified in 3GPP standard specification.

FIG. 19 illustrates a flowchart of method 1900 for a UE behavior in an L1/L2-based mobility procedure without MAC reset/reconfiguration/(re)-establishment according to embodiments of the present disclosure. The method 1900 as may be performed by a UE (e.g., 111-116 as illustrated in FIG. 1). An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

For one embodiment, the L1/L2-based inter-cell mobility procedure without MAC reset/reconfiguration/(re)-establishment or with partial MAC reset is illustrated in FIG. 19 5 for the UE behavior.

In FIG. 19, the UE performs the L1/L2-based HO procedure without time to trigger. At operation 1905, the UE receives a RRCReconfiguration message(s) for L1/L2-based mobility configuration from the serving gNB, including candidate cell PCI and/or logical ID, and/or a transmission configuration indicator (TCI) state configuration, and/or a measurement and reporting configuration, and/or a common/dedicated serving cell configuration for candidate cells.

At operation 1910, the UE sends RRCReconfiguration-Complete message to the serving gNB. At operation 1915, the UE performs measurement for the SSB(s) and/or CSI-RS(s) of serving cell and candidate cells and reports separate or joint measurement results including L1-RSRP(s) of serving cell and candidate cells to the serving gNB. At operation 1920, the UE receives L1/L2 signaling from the serving gNB that triggers the HO to the target cell. At operation 1925, the UE performs HO to the target cell without MAC reset/reconfiguration/(re)-establishment or with partial MAC reset and applies the target cell configuration that is pre-configured by the RRCReconfiguration message.

In one example of operation 1925, the UE does not perform MAC reset/reconfiguration/(re)-establishment if the NW requests/indicates no MAC reset/reconfiguration/(re)-establishment for the L1/L2 handover to the target cell in a pre-configured L1/L2 mobility configuration at operation 1905 or in L1/L2 HO command by RRC message or MAC CE or DCI with an explicit or implicit indication of no MAC reset/reconfiguration/(re)-establishment at operation 1920.

As an example, the UE does not perform MAC reset/reconfiguration/(re)-establishment if the target cell configuration does not include reconfiguration with sync; and/or if a random access procedure is not performed for the L1/L2 handover to the target cell. For another example, the UE does not perform MAC reset/reconfiguration/(re)-establishment if any procedure-specific indication, e.g., HARQ resume indication and/or LCP no reset indication, etc., is included in a pre-configured L1/L2 mobility configuration at operation 1905 or in L1/L2 HO command by RRC message or MAC CE or DCI at operation 1920. In one more example, the UE does not perform MAC reset/reconfiguration/(re)-establishment if it is pre-defined in the specification that MAC reset/reconfiguration/(re)-establishment is not performed for L1/L2 mobility operation. In one another example, the UE does not perform MAC reset/reconfiguration/(re)-establishment if the target cell configuration at operation 1805 does not include MAC configuration, e.g., mac-CellGroupConfig.

For another example, the UE does not perform MAC reset/reconfiguration/(re)-establishment and/or performs partial MAC reset/reconfiguration/(re)-establishment and/or does not perform PDCP sequence number (SN) and hyper frame number (HFN) reset for RLC-AM bearers and/or for RLC-UM bearers and/or does not perform PDCP/RLC entity reconfiguration/(re)-establishment if the HO command received at operation 1820 explicitly or implicitly indicates that the HO is intra-DU. In one example, the UE can know the HO is intra-DU if the target cell and the source cell are from the same cell group by explicit indication (e.g., configured with the same cell group ID); or if the target cell is one of the SCells configured in the cell group of the source cell; or if the target cell and the source cell or are associated with the same cell group configuration; or the HO command indicates a cell group configuration ID to be applied for the target cell that is the same as the source cell's cell group configuration ID.

If MAC is not reset or is partially reset, the MAC entity may: (1) not initialize B1 for each logical channel to zero; (2) not stop (if running) all timers, except MBS broadcast DRX timers; (3) keep all timeAlignmentTimers, inactive-PosSRS-TimeAlignmentTimer, and/or cg-SDT-TimeAlignmentTimer, if configured, running and perform the corresponding actions; (4) not change the NDIs for all uplink HARQ processes; (5) not change the NDIs for all HARQ process IDs for monitoring PDCCH in a sidelink resource allocation mode 1; (6) not cancel, if any, triggered scheduling request procedure; (7) not cancel, if any, triggered buffer status reporting procedure; and/or (8) keep the soft buffers for all DL HARQ processes, except for the DL HARQ process being used for MBS broadcast.

If a MAC reconfiguration is not triggered, the UE does not reconfigure the MAC main configuration of the cell group of the target cell.

In one embodiment of operation 525, the HARQ procedure can be interrupted by L1/L2 handover to the target cell, for example, the DL/UL HARQ processes are not completed before the UE performs L1/L2 handover to the target cell. For this case, the NW can enable HARQ resume so that the uncompleted HARQ process(es) can be continued once the UE successfully switches to the target cell.

FIG. 20 illustrates a flowchart of method 2000 for a UE behavior for DL HARQ resume at L1/L2-based mobility according to embodiments of the present disclosure. The method 2000 as may be performed by a UE (e.g., 111-116 as illustrated in FIG. 1). An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

FIG. 21 illustrates a flowchart of method 2100 for a BS behavior for DL HARQ resume at L1/L2-based mobility according to embodiments of the present disclosure. The method 2100 as may be performed by a BS (e.g., 101-103 as illustrated in FIG. 1). An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

FIG. 20 and FIG. 21 illustrate an embodiment of DL HARQ resume for UE behavior and BS behavior, respectively.

From a UE perspective, at operation 2005, the UE receives the DL HARQ resume indication explicitly or implicitly. In one example, HARQ resume can be enabled by an explicit one-bit indication in the pre-configured L1/L2 mobility configuration or in L1/L2 HO command by RRC message or MAC CE or DCI. Alternatively, the L1/L2 HO command by RRC message or MAC CE or DCI implicitly indicates HARQ resume is enabled. As another example, in L1/L2 HO command by RRC message or MAC CE or DCI, the DL HARQ process to be resumed can be indicated by the HARQ process ID. As one more example, in L1/L2 HO command by RRC message or MAC CE or DCI, a bitmap with the length of total number of configured or ongoing DL HARQ processes, can be used, where 1 indicates the HARQ process represented by that bit is requested to be resumed and 0 indicates the HARQ process represented by that bit is not to be resumed.

At operation 2010, if DL HARQ resume is enabled, the UE keeps the data in the soft buffer while performing the L1/L2 HO to the target cell. In one example, if the ACK/NACK for a HARQ process has not sent out before L1/L2 HO is triggered, the UE sends ACK/NACK feedback for that HARQ process in Msg3 or Msg5 or MsgA in the random access procedure for L1/L2 HO and/or in the confirmation MAC CE for L1/L2 HO. In another example, if bundling operation was performed and not completed with configured number of repetitions for a HARQ process before L1/L2 HO is triggered, the UE sends ACK/NACK feedback for that HARQ process in Msg3 or Msg5 or MsgA in the random access procedure for L1/L2 HO and/or in the confirmation MAC CE for L1/L2 HO.

At operation 2015, the UE receives a downlink assignment indication and associated HARQ information for each HARQ process to be resumed after successful L1/L2 HO to the target cell. For dynamic scheduling, the UE receives the downlink assignment in DCI format in PDCCH. For semi-persistent scheduling (SPS), the UE receives an activation indication for the configured scheduling in DCI format addressed to CS-RNTI in PDCCH. In one example, the HARQ process to be resumed is indicated implicitly by using the same HARQ process ID, i.e., the HARQ process ID is not changed before and after the L1/L2 HO, and the NDI is set to indicate this is a retransmission. In this way, the UE consider the HARQ process with the unchanged ID is resumed. Alternatively, a new HARQ process ID can be used but linked to an old ID that was used for an unfinished HARQ process before L1/L2 HO and the UE considers the HARQ process with the new ID as the resume to the HARQ process with the old ID.

At operation 2020, the UE receives retransmission(s) for each resumed HARQ process and decodes data. In one example of resuming bundling operation in a resumed HARQ process, the UE can receive the remaining number of repetitions that were not transmitted before L1/L2 HO was triggered; alternatively, the UE can receive configured number of repetitions for the resumed bundling operation. For each resumed HARQ process, the MAC entity allocates the TB(s) received from the physical layer and the associated HARQ information to the HARQ process indicated by the associated HARQ information. The MAC entity instructs the physical layer to combine the received data with the data currently in the soft buffer for this TB and attempt to decode the combined data. If the data is successfully decoded for this TB, the MAC entity delivers the decoded MAC PDU to the disassembly and demultiplexing entity; otherwise, the MAC entity instructs the physical layer to replace the data in the soft buffer for this TB with the data which the MAC entity attempted to decode.

At operation 2025, the UE sends ACK/NACK feedback for each resumed HARQ process. The MAC entity instructs the physical layer to generate ACK/NACK of the data in this TB for each resumed HARQ process that is not configured with HARQ feedback disabling or not defined as a HARQ process without feedback.

From a BS perspective, at operation 2105, the BS transmits the DL HARQ resume indication explicitly or implicitly. In one example, HARQ resume can be enabled by an explicit one-bit indication in the pre-configured L1/L2 mobility configuration or in L1/L2 HO command by RRC message or MAC CE or DCI. Alternatively, the L1/L2 HO command by RRC message or MAC CE or DCI implicitly indicates HARQ resume is enabled. As another example, in L1/L2 HO command by RRC message or MAC CE or DCI, the DL HARQ process to be resumed can be indicated by the HARQ process ID. As one more example, in L1/L2 HO command by RRC message or MAC CE or DCI, a bitmap with the length of total number of configured or ongoing DL HARQ processes, can be used, where 1 indicates the HARQ process represented by that bit is requested to be resumed and 0 indicates the HARQ process represented by that bit is not to be resumed.

At operation 2110, if the ACK/NACK feedback for a HARQ process has not sent out by the UE before L1/L2 HO is triggered, the BS receives ACK/NACK feedback for that HARQ process in Msg3 or Msg5 or MsgA in the random access procedure for L1/L2 HO and/or in the confirmation MAC CE for L1/L2 HO. In another example, if bundling operation was performed and not completed with transmitting configured number of repetitions for a HARQ process before L1/L2 HO is triggered, the BS receives ACK/NACK feedback for that HARQ process in Msg3 or Msg5 or MsgA in the random access procedure for L1/L2 HO and/or in the confirmation MAC CE for L1/L2 HO.

At operation 2115, the BS schedules downlink assignment for each HARQ process to be resumed after successful L1/L2 HO to the target cell. The BS can determine HARQ processes to be resumed based on the HARQ feedback received at operation 2110. For dynamic scheduling, the BS indicates the downlink assignment in DCI format in PDCCH. For semi-persistent scheduling (SPS), the BS activates configured scheduling in DCI format addressed to CS-RNTI in PDCCH. In one example, the HARQ process to be resumed is indicated implicitly by using the same HARQ process ID, i.e., the HARQ process ID is not changed before and after the L1/L2 HO, and the NDI is set to indicate this is a retransmission. In this way, the BS indicates the HARQ process with the unchanged ID is resumed. Alternatively, a new HARQ process ID can be used but linked to an old ID that was used for an unfinished HARQ process before L1/L2 HO and the BS indicates the HARQ process with the new ID as the resume to the HARQ process with the old ID.

At operation 2120, the BS sends retransmission(s) for each resumed HARQ process. In one example of resuming bundling operation in a resumed HARQ process, the BS transmits the remaining number of repetitions that were not transmitted before L1/L2 HO was triggered; alternatively, the BS can transmit configured number of repetitions for the resumed bundling operation.

At operation 2125, the BS receives ACK/NACK feedback for each resumed HARQ process.

FIG. 22 illustrates a flowchart of method 2200 for a UE behavior for UL HARQ resume at L1/L2-based mobility according to embodiments of the present disclosure. The method 2200 as may be performed by a UE (e.g., 111-116 as illustrated in FIG. 1). An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

FIG. 23 illustrates a flowchart of method 2300 for a BS behavior for UL HARQ resume at L1/L2-based mobility according to embodiments of the present disclosure. The method 2300 as may be performed by a BS (e.g., 101-103 as illustrated in FIG. 1). An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

FIG. 22 and FIG. 23 illustrate an embodiment of UL HARQ resume for UE behavior and BS behavior, respectively.

From a UE perspective, at operation 2205, the UE receives the UL HARQ resume indication explicitly or implicitly. In one example, HARQ resume can be enabled by an explicit one-bit indication in the pre-configured L1/L2 mobility configuration or in L1/L2 HO command by RRC message or MAC CE or DCI. Alternatively, the L1/L2 HO command by RRC message or MAC CE or DCI implicitly indicates HARQ resume is enabled. As another example, in L1/L2 HO command by RRC message or MAC CE or DCI, the UL HARQ process to be resumed can be indicated by the HARQ process ID. As one more example, in L1/L2 HO command by RRC message or MAC CE or DCI, a bitmap with the length of total number of configured or ongoing UL HARQ processes, can be used, where 1 indicates the HARQ process represented by that bit is requested to be resumed and 0 indicates the HARQ process represented by that bit is not to be resumed.

At operation 2210, if UL HARQ resume is enabled, the UE keeps the data in the corresponding HARQ buffer and/or sets the NDIs for all uplink HARQ processes unchanged while performing the L1/L2 HO to the target cell. In one example, if a UL HARQ process was performed using configured grant before L1/L2 HO is triggered and the configuredGrantTimer and/or the cg-RetransmissionTimer for the corresponding HARQ process are running, the UE stops the configuredGrantTimer and/or the cg-RetransmissionTimer and considers the corresponding HARQ process as pending. In another example, if bundling operation was performed and not completed with transmitting configured number of repetitions for a HARQ process before L1/L2 HO is triggered, the UE considers the corresponding HARQ process as pending.

At operation 2215, the UE receives uplink grant and the associated HARQ information for each HARQ process to be resumed after successful L1/L2 HO to the target cell. The HARQ entity delivers the uplink grant and the HARQ information of the TB to the identified HARQ process and instructs the identified HARQ process to trigger a retransmission. For dynamic scheduling, the UE receives the uplink grant indication in DCI format in PDCCH. For semi-persistent scheduling (SPS), the UE receives an uplink grant indication for the configured grant in DCI format addressed to CS-RNTI in PDCCH. In one example, the HARQ process to be resumed is indicated implicitly by using the same HARQ process ID, i.e., the HARQ process ID is not changed before and after the L1/L2 HO, and the NDI is set to indicate a retransmission is required.

In this way, the UE considers the HARQ process with the unchanged ID is resumed. Alternatively, a new HARQ process ID can be used but linked to an old ID that was used for an unfinished HARQ process before L1/L2 HO and the UE considers the HARQ process with the new ID as the resume to the HARQ process with the old ID. For the HARQ process(es) not to be resumed, the NDI is set to indicate a new transmission.

At operation 2220, the UE transmits retransmission(s) for each resumed HARQ process using the associated uplink grant. In one example of resuming bundling operation in a resumed HARQ process, the UE can transmit the remaining number of repetitions that were not transmitted before L1/L2

HO was triggered; alternatively, the UE can transmit configured number of repetitions for the resumed bundling operation. If the uplink grant is addressed to CS-RNTI; or if the uplink grant is addressed to C-RNTI, and the identified HARQ process is configured for a configured uplink grant, the HARQ entity starts or restarts the configuredGrantTimer and/or cg-RetransmissionTimer, if configured, at the beginning of the first symbol of the PUSCH transmission for the corresponding HARQ process when the retransmission is performed if an LBT failure indication is not received from lower layers.

At operation 2225, the UE receives downlink feedback information for each resumed HARQ process. If a HARQ process receives downlink feedback information, the HARQ process may stop the cg-RetransmissionTimer, if running; if acknowledgement is indicated, the HARQ process may stop the configuredGrantTimer, if running. If the configuredGrantTimer expires for a HARQ process, the HARQ process may stop the cg-Retransmission Timer, if running.

From a BS perspective, at operation 2305, the BS transmits the UL HARQ resume indication explicitly or implicitly. In one example, HARQ resume can be enabled by an explicit one-bit indication in the pre-configured L1/L2 mobility configuration or in L1/L2 HO command by RRC message or MAC CE or DCI. Alternatively, the L1/L2 HO command by RRC message or MAC CE or DCI implicitly indicates HARQ resume is enabled. As another example, in L1/L2 HO command by RRC message or MAC CE or DCI, the UL HARQ process to be resumed can be indicated by the HARQ process ID. As one more example, in L1/L2 HO command by RRC message or MAC CE or DCI, a bitmap with the length of total number of configured or ongoing UL HARQ processes, can be used, where 1 indicates the HARQ process represented by that bit is requested to be resumed and 0 indicates the HARQ process represented by that bit is not to be resumed.

At operation 2310, the BS transmits an uplink grant indication and the associated HARQ information for each HARQ process to be resumed after UE successfully completes L1/L2 HO to the target cell. For dynamic scheduling, the BS transmits the uplink grant indication in DCI format in PDCCH. For semi-persistent scheduling (SPS), the BS transmits the uplink grant indication for the configured grant in DCI format addressed to CS-RNTI in PDCCH. In one example, the HARQ process to be resumed is indicated implicitly by using the same HARQ process ID, i.e., the HARQ process ID is not changed before and after the L1/L2 HO, and the NDI is set to indicate a retransmission is required. In this way, the BS indicates the HARQ process with the unchanged ID is resumed.

Alternatively, a new HARQ process ID can be used but linked to an old ID that was used for an unfinished HARQ process before L1/L2 HO and the BS indicates the HARQ process with the new ID as the resume to the HARQ process with the old ID. For the HARQ process(es) not to be resumed, the NDI is set to indicate a new transmission.

At operation 2315, the BS receives retransmission(s) for each resumed HARQ process. In one example of resuming bundling operation in a resumed HARQ process, the BS can receive the remaining number of repetitions that were not transmitted before L1/L2 HO was triggered; alternatively, the BS can receive configured number of repetitions for the resumed bundling operation.

At operation 2320, the BS transmits downlink feedback information for each resumed HARQ process.

Figure 24:
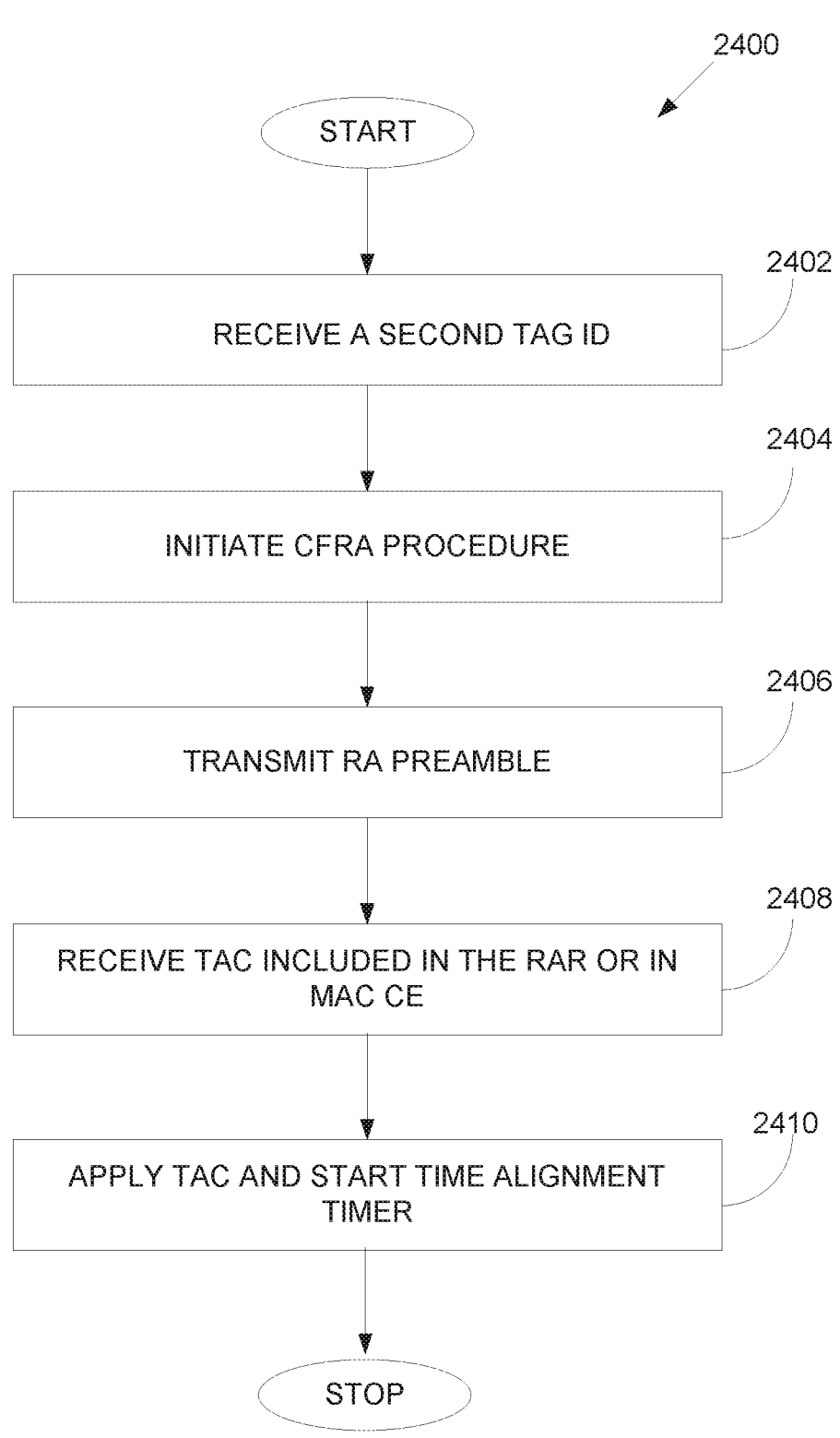
FIG. 24 illustrates a flowchart of method for timing advance management for multiple-TRP and beam management according to embodiments of the present disclosure.

FIG. 24 illustrates a flowchart of method 2400 for timing advance management for multiple-TRP and beam management according to embodiments of the present disclosure. The method 2400 as may be performed by a UE (e.g., 111-116 as illustrated in FIG. 1). An embodiment of the method 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

As illustrated in FIG. 24, the method 2400 begins at 2402. In step 2402, a UE receives, from a first BS, a second TAG ID associated with a second BS and a PDCCH order.

In one embodiment, the PDCCH order indicates at least one of SSB index associated with the second BS or TCI states associated with the second BS.

In one embodiment, the first BS is a first TRP in a serving cell; and the second BS is a second TRP in the serving cell or in a cell with PCI other than a serving cell PCI.

Subsequently, in step 2404, the UE initiates a CFRA procedure in response to receiving the PDCCH order.

Subsequently, in step 2406, the UE transmits, to a second BS, a RA preamble.

Next, in step 2408, the UE receives, for the second BS, a TAC included in a RAR or in a MAC CE.

In one embodiment, the MAC CE includes a TA associated with the second TAG ID corresponding to the second BS, the MAC CE includes a TA associated with a coresetPoolIndex corresponding to the second BS, or the MAC CE includes a TA associated with a TCI state ID corresponding to the second BS. In one embodiment, the MAC CE is identified by a MAC sub-header comprising a LCID or an eLCID.

In one embodiment, the MAC CE includes a first TA associated with a first TAG ID for the first BS and a TA offset; the processor is further configured to determine, based on the first TA and the TA offset, a second TA for the second BS; and the MAC CE is identified by a MAC sub-header comprising a LCID or an eLCID.

Finally, in step 2410, the UE applies the TAC and start a second time alignment timer corresponding to the second TAG ID associated with the second BS.

In one embodiment, the UE determines whether the second time alignment timer for the second TAG associated with the second BS expires. The UE, based on a determination that the second time alignment timer expires: stops UL transmissions to the second BS, clears DL assignments associated with the second BS, or releases UL resources associated with the second BS.

In one embodiment, the UE determines whether a first time alignment timer associated with the first BS in a serving cell and the second time alignment timer associated with the second BS in the serving cell expire. In one embodiment, the UE, based on a determination that the first time alignment timer and the second time alignment timer expire, stops UL transmissions, releases UL resources associated with the first BS and the second BS, and clears DL assignments associated with the first BS and the second BS.

In one embodiment, the UE transmits a UE capability indication indicating whether the UE supports multiples TAGs or a single TAG for a multiple-TRP operation for a serving cell.

In one embodiment, the UE associates a first set of TCI states or a first coresetPoolIndex with a first TAG ID for the first BS and associate a second set of TCI states or a second coresetPoolIndex with a second TAG ID for the second BS.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, from a first base station (BS), a second timing advance group (TAG) identifier (ID) for transmission configuration indicator (TCI) states associated with a second BS, a contention-free random access (CFRA) resource associated with the second BS, and a physical downlink control channel (PDCCH) order; and
a processor operably coupled to the transceiver, the processor configured to initiate a CFRA procedure using the CFRA resource in response to receiving the PDCCH order,
wherein the transceiver is further configured to:
transmit, to the second BS, a random access (RA) preamble, and
receive, for the second BS, a timing advance (TA) command (TAC) for the second TAG ID indicated in a random access response (RAR) or in a medium access control control element (MAC CE), and
wherein the processor is further configured to apply the TAC and start a second time alignment timer corresponding to the second TAG ID associated with the second BS, and
wherein the TAC is used for uplink (UL) transmissions using the TCI states associated with the second TAG ID.

2. The UE of claim 1, wherein the PDCCH order indicates at least one of a synchronization signal/physical broadcast channel (PBCH) block (SSB) index associated with the second BS or the TCI states associated with the second BS.

3. The UE of claim 1, wherein:
the MAC CE includes a TA associated with the second TAG ID corresponding to the second BS,
the MAC CE includes a TA associated with a coresetPoolIndex corresponding to the second BS, or
the MAC CE includes a TA associated with a TCI state ID corresponding to the second BS, and
the MAC CE is identified by a MAC sub-header comprising a logical channel identifier (LCID) or an enhanced LCID (eLCID).

4. The UE of claim 1, wherein:
the MAC CE includes a first TA associated with a first TAG ID for the first BS and a TA offset;
the processor is further configured to determine, based on the first TA and the TA offset, a second TA for the second BS; and
the MAC CE is identified by a MAC sub-header comprising a logical channel identifier (LCID) or an enhanced LCID (eLCID).

5. The UE of claim 1, wherein the processor is further configured to:

determine whether the second time alignment timer for the second TAG ID associated with the second BS expires; and based on a determination that the second time alignment timer expires:

stop the UL transmissions to the second BS, clear DL assignments associated with the second BS, or release UL resources associated with the second BS.

6. The UE of claim 1, wherein the processor is further configured to:

determine whether a first time alignment timer associated with the first BS in a serving cell and the second time alignment timer associated with the second BS in the serving cell expire; and based on a determination that the first time alignment timer and the second time alignment timer expire:

stop the UL transmissions, release UL resources associated with the first BS and the second BS, and clear downlink (DL) assignments associated with the first BS and the second BS.

7. The UE of claim 1, wherein:

the first BS is a first transmission reception point (TRP) in a serving cell; and the second BS is a second TRP in the serving cell or in a cell with physical cell identifier (PCI) other than a serving cell PCI.

8. The UE of claim 1, wherein the processor is further configured to associate a first set of the TCI states or a first coresetPoolIndex with a first TAG ID for the first BS and associate a second set of the TCI states or a second coresetPoolIndex with the second TAG ID for the second BS.

9. A method of a user equipment (UE), the method comprising:

receiving, from a first base station (BS), a second timing advance group (TAG) identifier (ID) for transmission configuration indicator (TCI) states associated with a second BS, a contention-free random access (CFRA) resource associated with the second BS, and a physical downlink control channel (PDCCH) order;

initiating a CFRA procedure using the CFRA resource in response to receiving the PDCCH order;

transmitting, to the second BS, a random access (RA) preamble;

receiving, for the second BS, a timing advance (TA) command (TAC) for the second TAG ID indicated in a random access response (RAR) or in a medium access control control element (MAC CE); and applying the TAC and starting a second time alignment timer corresponding to the second TAG ID associated with the second BS, wherein the TAC is used for uplink (UL) transmissions using the TCI states associated with the second TAG ID.

10. The method of claim 9, wherein the PDCCH order indicates at least one of a synchronization signal/physical broadcast channel (PBCH) block (SSB) index associated with the second BS or the TCI states associated with the second BS.

11. The method of claim 9, wherein:

the MAC CE includes a TA associated with the second TAG ID corresponding to the second BS, the MAC CE includes a TA associated with a coresetPoolIndex corresponding to the second BS, or the MAC CE includes a TA associated with a TCI state ID corresponding to the second BS, and the MAC CE is identified by a MAC sub-header comprising a logical channel identifier (LCID) or an enhanced LCID (eLCID).

12. The method of claim 9, further comprising determining, based on a first TA and a TA offset, a second TA for the second BS, wherein:

the MAC CE includes the first TA associated with a first TAG ID for the first BS and the TA offset, and the MAC CE is identified by a MAC sub-header comprising a logical channel identifier (LCID) or an enhanced LCID (eLCID).

13. The method of claim 9, further comprising:

determining whether the second time alignment timer for the second TAG ID associated with the second BS expires; and based on a determination that the second time alignment timer expires:

stopping the UL transmissions to the second BS, clearing DL assignments associated with the second BS, or releasing UL resources associated with the second BS.

14. The method of claim 9, further comprising:

determining whether a first time alignment timer associated with the first BS in a serving cell and the second time alignment timer associated with the second BS in the serving cell expire; and based on a determination that the first time alignment timer and the second time alignment timer expire:

stopping the UL transmissions, releasing UL resources associated with the first BS and the second BS, and clearing downlink (DL) assignments associated with the first BS and the second BS.

15. The method of claim 9, wherein:

the first BS is a first transmission reception point (TRP) in a serving cell; and the second BS is a second TRP in the serving cell or in a cell with physical cell identifier (PCI) other than a serving cell PCI.

16. The method of claim 9, wherein:

a first set of the TCI states or a first coresetPoolIndex is associated with a first TAG ID for the first BS; and a second set of the TCI states or a second coresetPoolIndex is associated with the second TAG ID for the second BS.

17. A first base station (BS) comprising:

a processor configured to generate a second timing advance group (TAG) identifier (ID) associated with a second BS and a physical downlink control channel (PDCCH) order; and a transceiver operably coupled to the processor, the transceiver configured to transmit, to a user equipment (UE), the second TAG ID for transmission configuration indicator (TCI) states associated with the second BS, a contention-free random access (CFRA) resource associated with the second BS, and the PDCCH order, wherein:

a random access (RA) preamble is transmitted to the second BS based on a CFRA procedure using the CFRA resource in response to receiving the PDCCH order;

a timing advance (TA) command (TAC) for the second TAG ID, for the second BS, indicated in a random access response (RAR) or in a medium access control control element (MAC CE), is applied;

a second time alignment timer corresponding to the second TAG ID associated with the second BS is started; and the TAC is used for uplink (UL) transmissions using the TCI states associated with the second TAG ID.

18. The first BS of claim 17, wherein the PDCCH order indicates at least one of a synchronization signal/physical broadcast channel (PBCH) block (SSB) index associated with the second BS or the TCI states associated with the second BS, wherein:

the MAC CE includes a TA associated with the second TAG ID corresponding to the second BS, the MAC CE includes a TA associated with a coreset-PoolIndex corresponding to the second BS, or the MAC CE includes a TA associated with a TCI state ID corresponding to the second BS, and the MAC CE is identified by a MAC sub-header comprising a logical channel identifier (LCID) or an enhanced LCID (eLCID).

19. The first BS of claim 17, wherein:

the MAC CE includes a first TA associated with a first TAG ID for the first BS and a TA offset; and the MAC CE is identified by a MAC sub-header comprising a logical channel identifier (LCID) or an enhanced LCID (eLCID).

20. The first BS of claim 17, wherein:

the first BS is a first transmission reception point (TRP) in a serving cell; and the second BS is a second TRP in the serving cell or in a cell with physical cell identifier (PCI) other than a serving cell PCI.

* * * * *